US012673432B2

(12) United States Patent
Fishel et al.

(10) Patent No.: US 12,673,432 B2
(45) Date of Patent: Jul. 7, 2026

(54) METHOD OF MANUFACTURING A FLUIDIC TACTILE SENSOR

(71) Applicant: SANCTUARY COGNITIVE SYSTEMS CORPORATION, Vancouver (CA)

(72) Inventors: Jeremy A. Fishel, Chico, CA (US); William Cortez, Chico, CA (US); Jacob Grout, Chico, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 173 days.

(21) Appl. No.: 18/764,270

(22) Filed: Jul. 4, 2024

(65) Prior Publication Data

US 2025/0073917 A1    Mar. 6, 2025

Related U.S. Application Data

(60) Provisional application No. 63/535,039, filed on Aug. 28, 2023.

(51) Int. Cl.
B25J 13/08        (2006.01)
B29C 44/12        (2006.01)

(52) U.S. Cl.
CPC ............. B25J 13/084 (2013.01); B29C 44/12 (2013.01)

(58) Field of Classification Search
CPC ............................... B25J 13/084; B29C 44/12
See application file for complete search history.

(56) References Cited

FOREIGN PATENT DOCUMENTS

WO        WO-2018210731 A1 * 11/2018    ............. G01L 5/228

* cited by examiner

*Primary Examiner* — JaMel M Nelson
*Assistant Examiner* — Erica Hartsell Funk
(74) *Attorney, Agent, or Firm* — Adenike Adebiyi; Thomas Mahon

(57)        ABSTRACT

A method of manufacturing a fluidic tactile sensor includes forming a mold insert having an insoluble sensor core and a soluble skin insert attached to an outer surface of the sensor core. An elastic skin is molded over the mold insert to form a sensor preform in which the skin insert is encapsulated between the elastic skin and the sensor core. The skin insert is removed from between the elastic skin and the sensor core, at least partly by dissolving the skin insert in a solvent, to form a sensor body having one or more cells between the elastic skin and the sensor core. A pressure sensing circuit is attached to the sensor core of the sensor body.

20 Claims, 31 Drawing Sheets

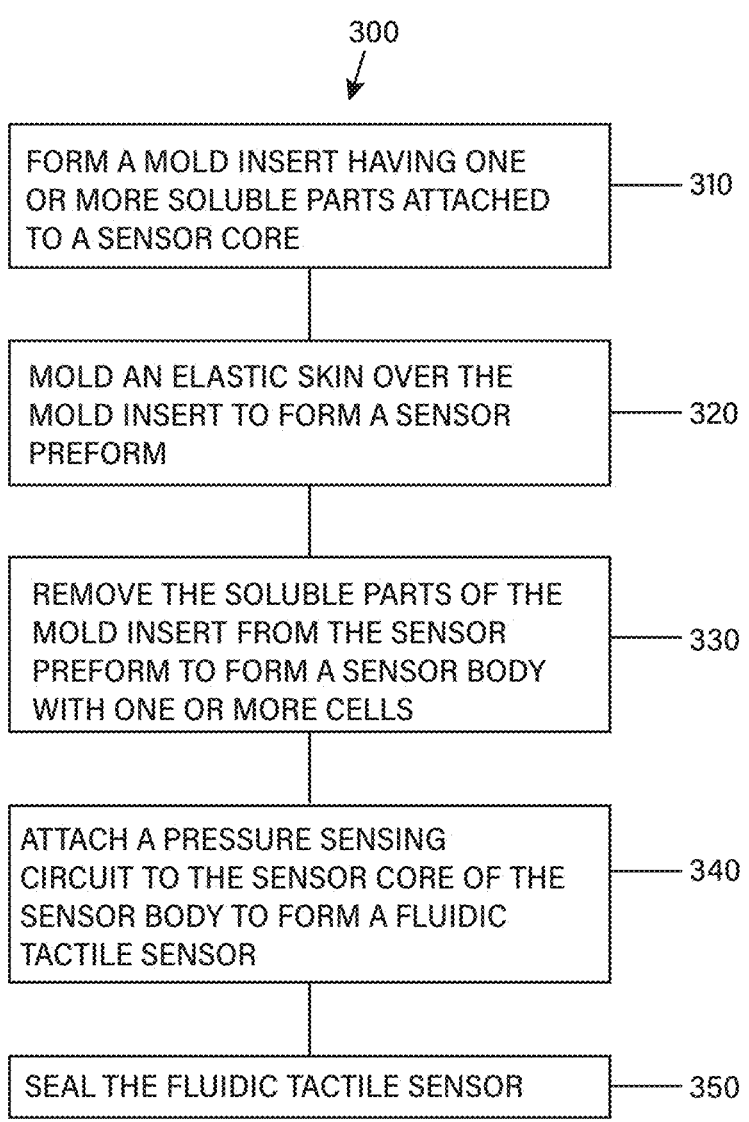

300

FORM A MOLD INSERT HAVING ONE OR MORE SOLUBLE PARTS ATTACHED TO A SENSOR CORE — 310

MOLD AN ELASTIC SKIN OVER THE MOLD INSERT TO FORM A SENSOR PREFORM — 320

REMOVE THE SOLUBLE PARTS OF THE MOLD INSERT FROM THE SENSOR PREFORM TO FORM A SENSOR BODY WITH ONE OR MORE CELLS — 330

ATTACH A PRESSURE SENSING CIRCUIT TO THE SENSOR CORE OF THE SENSOR BODY TO FORM A FLUIDIC TACTILE SENSOR — 340

SEAL THE FLUIDIC TACTILE SENSOR — 350

FIG. 11

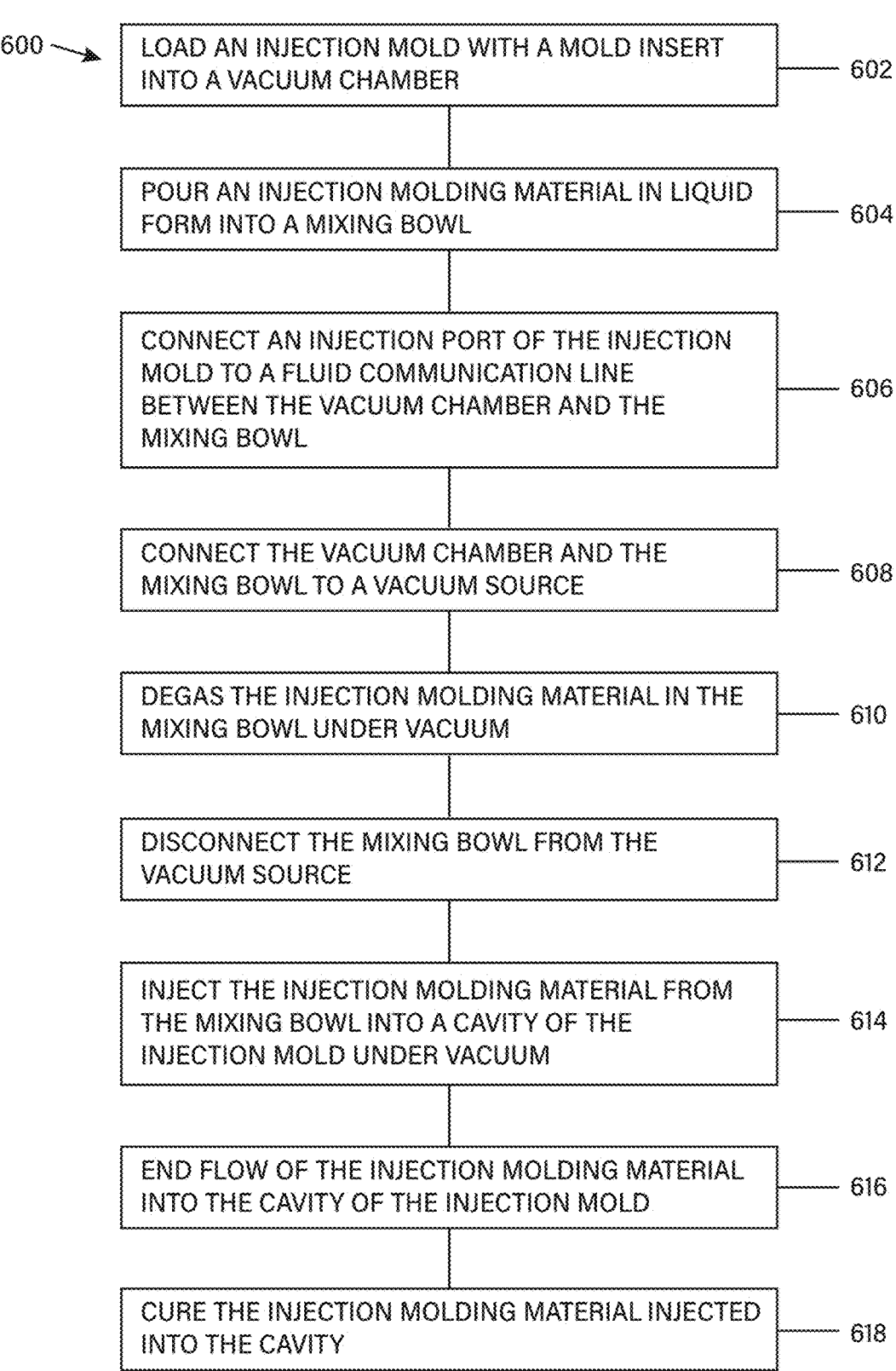

600

LOAD AN INJECTION MOLD WITH A MOLD INSERT INTO A VACUUM CHAMBER — 602

POUR AN INJECTION MOLDING MATERIAL IN LIQUID FORM INTO A MIXING BOWL — 604

CONNECT AN INJECTION PORT OF THE INJECTION MOLD TO A FLUID COMMUNICATION LINE BETWEEN THE VACUUM CHAMBER AND THE MIXING BOWL — 606

CONNECT THE VACUUM CHAMBER AND THE MIXING BOWL TO A VACUUM SOURCE — 608

DEGAS THE INJECTION MOLDING MATERIAL IN THE MIXING BOWL UNDER VACUUM — 610

DISCONNECT THE MIXING BOWL FROM THE VACUUM SOURCE — 612

INJECT THE INJECTION MOLDING MATERIAL FROM THE MIXING BOWL INTO A CAVITY OF THE INJECTION MOLD UNDER VACUUM — 614

END FLOW OF THE INJECTION MOLDING MATERIAL INTO THE CAVITY OF THE INJECTION MOLD — 616

CURE THE INJECTION MOLDING MATERIAL INJECTED INTO THE CAVITY — 618

FIG. 15

METHOD OF MANUFACTURING A FLUIDIC TACTILE SENSOR

CROSS-REFERENCE TO RELATED APPLICATIONS

This application claims the benefit of U.S. Provisional Application No. 63/535,039, filed Aug. 28, 2023, the content of which is incorporated herein by reference.

FIELD

The field generally relates to robotics and particularly to tactile sensing in robotics.

BACKGROUND

Robots are machines that can sense their environments and perform tasks autonomously or semi-autonomously or via teleoperation. A humanoid robot is a robot or machine having an appearance and/or character resembling that of a human. Humanoid robots can be designed to function as team members with humans in diverse applications, such as construction, manufacturing, monitoring, exploration, learning, and entertainment. Humanoid robots can be particularly advantageous in substituting for humans in environments that may be dangerous to humans or uninhabitable by humans.

SUMMARY

Disclosed herein is a method of manufacturing a fluidic tactile sensor that can be attached to a surface of an object to provide the object with tactile sensing at the surface.

In a representative example, the method includes forming a mold insert comprising a sensor core and a skin insert attached to an outer surface of the sensor core, wherein the skin insert is at least partially soluble in a solvent and the sensor core is insoluble in the solvent. The method includes molding an elastic skin over the mold insert to form a sensor preform, wherein the skin insert is encapsulated between the elastic skin and the sensor core. The method includes removing the skin insert from between the elastic skin and the sensor core to form a sensor body having one or more cells between the elastic skin and the sensor core, wherein the skin insert is removed at least in part by applying the solvent to the skin insert to at least partially dissolve the skin insert. The method includes attaching a pressure sensing circuit to the sensor core of the sensor body.

BRIEF DESCRIPTION OF THE DRAWINGS

FIG. 11 is a flowchart illustrating a method of making a fluidic tactile sensor.

FIG. 15 is a flowchart illustrating a method of molding an elastic skin over a mold insert using the vacuum injection molding system of FIGS. 14A-14C.

DETAILED DESCRIPTION

General Considerations

Figure 1:
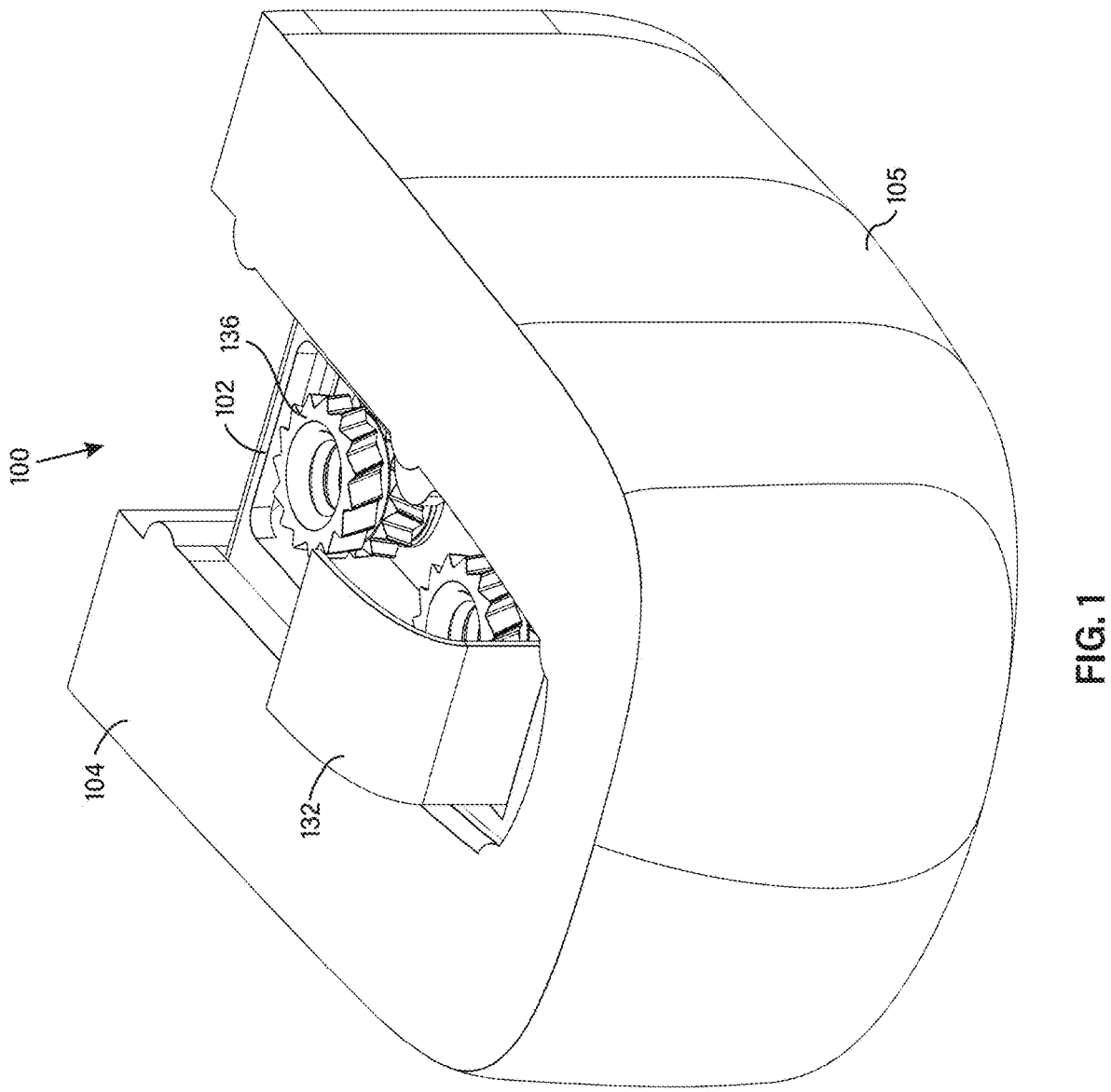
FIG. 1 is a perspective view of a fluidic tactile sensor.
Figure 2A:
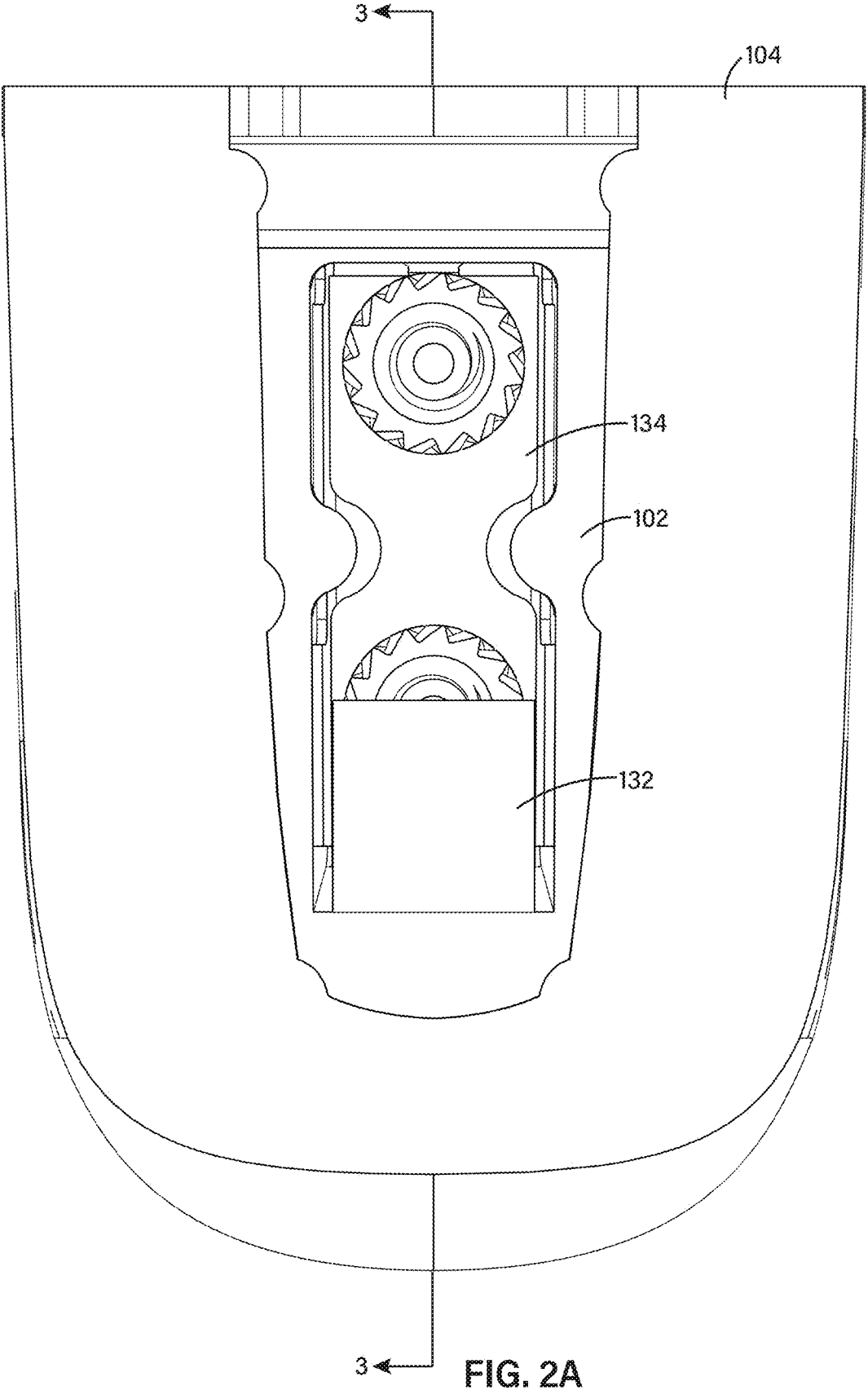
FIG. 2A is a top view of the fluidic tactile sensor shown in FIG. 1.
Figure 2B:
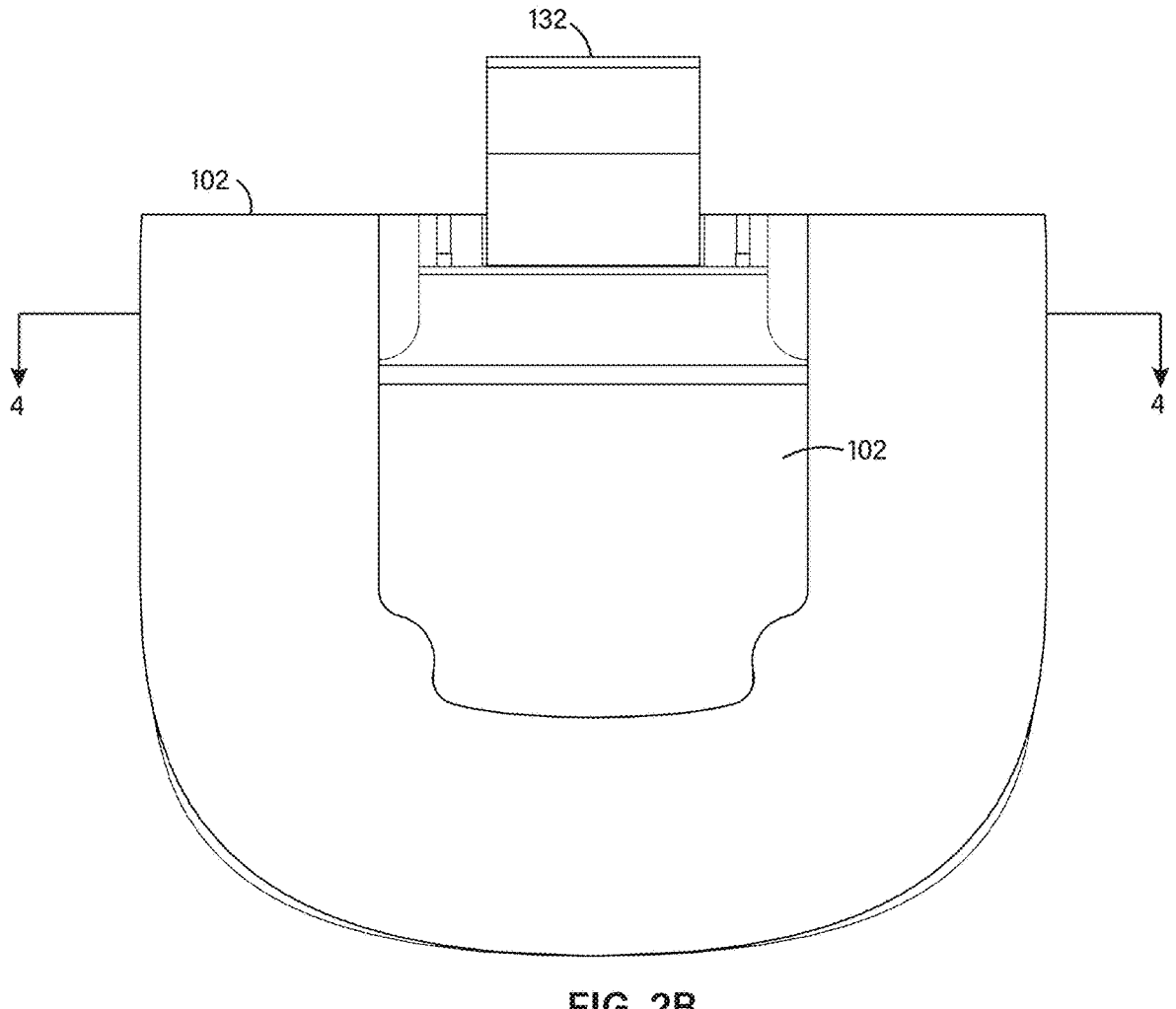
FIG. 2B is a rear view of the fluidic tactile sensor shown in FIG. 1.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

Described herein is a fluidic tactile sensor and a method of manufacturing the fluidic tactile sensor. The fluidic tactile sensor can detect contact pressure robustly and compliantly with high sensitivity and high signal-to-noise ratio. The fluidic tactile sensor can be adapted for attachment to any portion of an external surface of a robot, providing the robot with the ability to be sensitive to contacts and collisions, which can ultimately result in the robot performing tasks quickly and safely.

Example II—Fluidic Tactile Sensor

FIGS. 1-4 illustrate an exemplary fluidic tactile sensor 100 that can be attached to a surface of interest to enable tactile sensing. In some examples, the surface of interest can be any external surface of a robot where tactile sensing is desired (e.g., any external surface of a robotic hand). In the illustrated example, the fluidic tactile sensor 100 is shaped for attachment to a distal phalanx of a robotic digit (see FIGS. 8-10 and Example III). However, the fluidic tactile sensor 100 is not limited to this application and can be suitably shaped to conform to other external surfaces of a robot.

Figure 3:
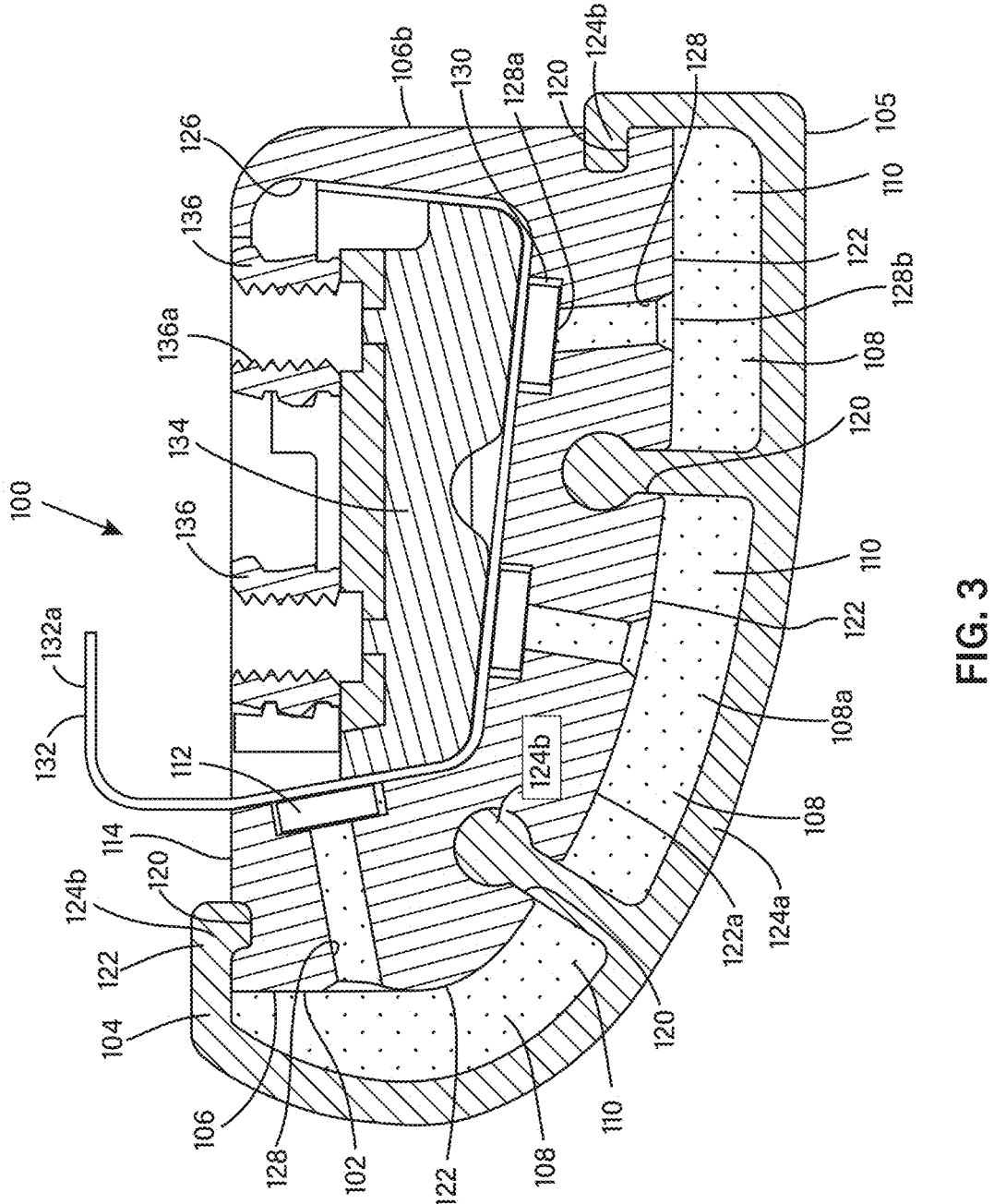
FIG. 3 is a cross-sectional view of the fluidic tactile sensor shown in FIG. 1 taken along line 3-3 as shown in FIG. 2A.

In some examples, as shown more clearly in FIG. 3, the fluidic tactile sensor 100 can include a core 102, an elastic skin 104 disposed around an outer core portion 106 of the core 102, and one or more cells 108 formed between the outer core portion 106 of the core 102 and the elastic skin 104. The cell 108 can contain a fluid medium 110. In some examples, the fluid medium 110 in the cells 108 can be a gas (e.g., air, which can be ambient or compressed, or other inert gas) or a liquid. In some examples, the liquid can have lubricative properties to reduce hysteresis (e.g., silicone oil). In other examples, the fluid medium 110 can be a biphasic fluid (e.g., a gel-like fluid).

The fluidic tactile sensor 100 can include one or more pressure transducers 112 arranged to sense fluid pressure changes inside the cells 108. In some examples, each cell 108 can have an associated pressure transducer 112. When a contact force is applied to the elastic skin 104 (e.g., by touching or colliding with the elastic skin 104), the elastic skin 104 can deform to cause a change in fluid pressure inside one or more of the cells 108. The location of the contact force on the elastic skin 104 and the magnitude of the contact force can be deduced from the outputs of the pressure transducers 112.

In some examples, the fluid 110 in the cells 108 can be compressed to a desired stiffness or reference pressure. In some examples, fluid compression can allow detection of possible damage to the fluidic tactile sensor 100 from the outputs of the pressure transducers 112. For example, an output of a pressure transducer 112 that shows a cell pressure below a reference pressure can indicate damage to the cell. In some examples, when the fluidic tactile sensor 100 is used on a robot, the robot can detect when the sensor might be faulty based on the outputs of the pressure transducers 112 and raise a service alert.

The elastic skin 104 can be formed from an elastomer or other resilient material. The fluid medium 110 and the material of the elastic skin 104 can be selected such that the elastic skin 104 is substantially impermeable to the fluid medium 110. In some examples, an external surface 105 of the elastic skin 104 can include textures (such as ridges) to facilitate gripping of surfaces with the elastic skin (e.g., if the fluidic tactile sensor 100 is used on a robotic digit).

In some examples, the core 102 can be a relatively rigid core such that the elastic skin 104 can be deformed without deforming the core 102. For example, the core 102 can be formed from hard plastic or metal. In examples where the core 102 is relatively rigid, tactile sensing can be primarily a function of the fluid pressure inside the cells 108. In other examples, the core 102 can be semi-rigid such that for a range of forces the core 102 can experience some deformation when the elastic skin 104 is deformed. In this case, tactile sensing can be a function of both the fluid pressure inside the cells 108 and the stiffness of the core 102 for the range of forces.

Figure 5:
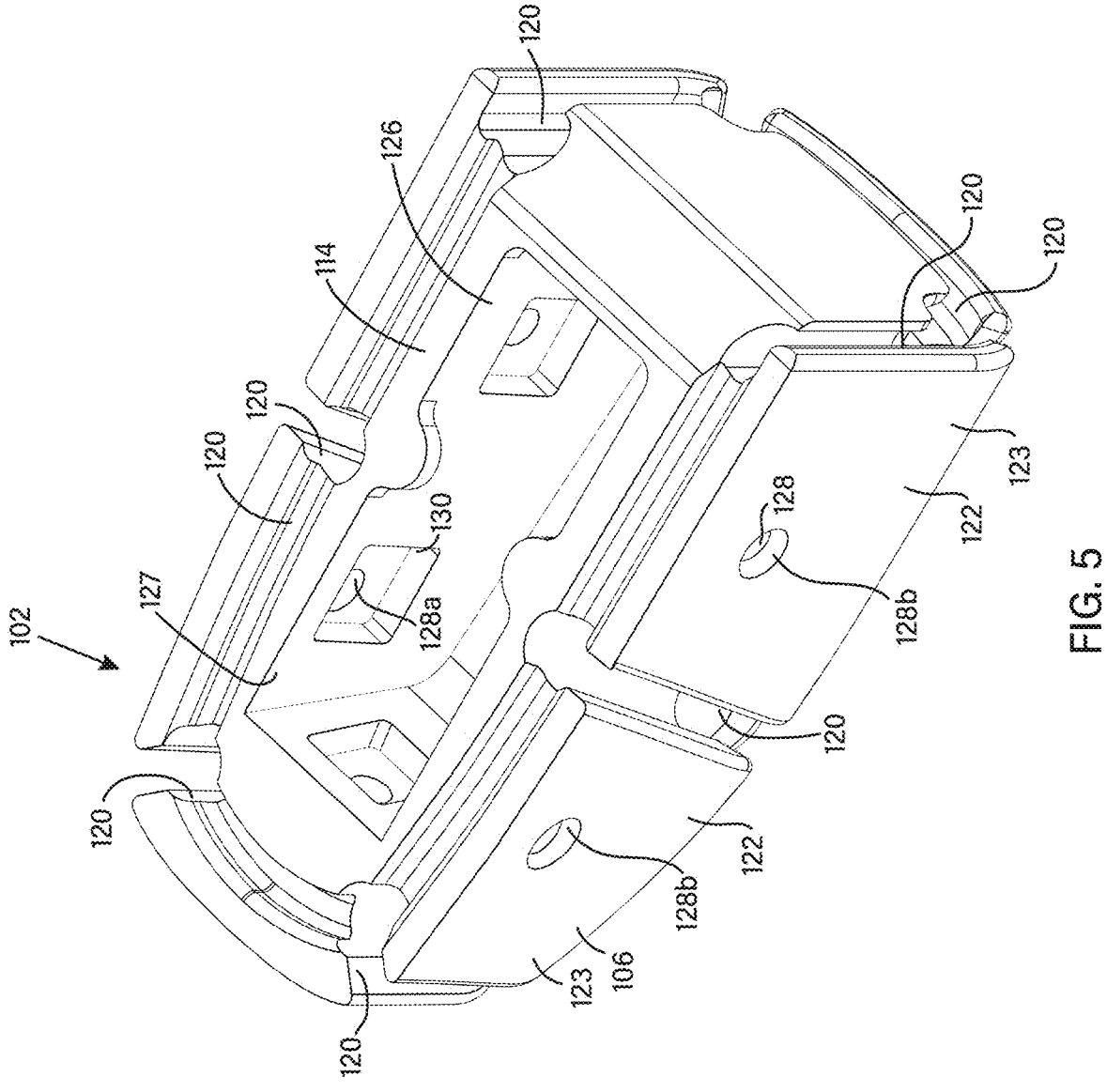
FIG. 5 is a perspective view of a core of the fluidic tactile sensor shown in FIG. 1.

In some examples, as shown more clearly in FIG. 5, the core 102 can include an inner core portion 114 nested within the outer core portion 106. In the example, the outer core portion 106 has a curved shape such that the core 102 has an overall non-planar geometry (e.g., a cross-section of the core 102 can have a U-shape). In other examples, the core 102 can have a planar geometry (e.g., the outer core portion 106 and the inner core portion 114 can be planar and arranged in a stack).

Figure 4:
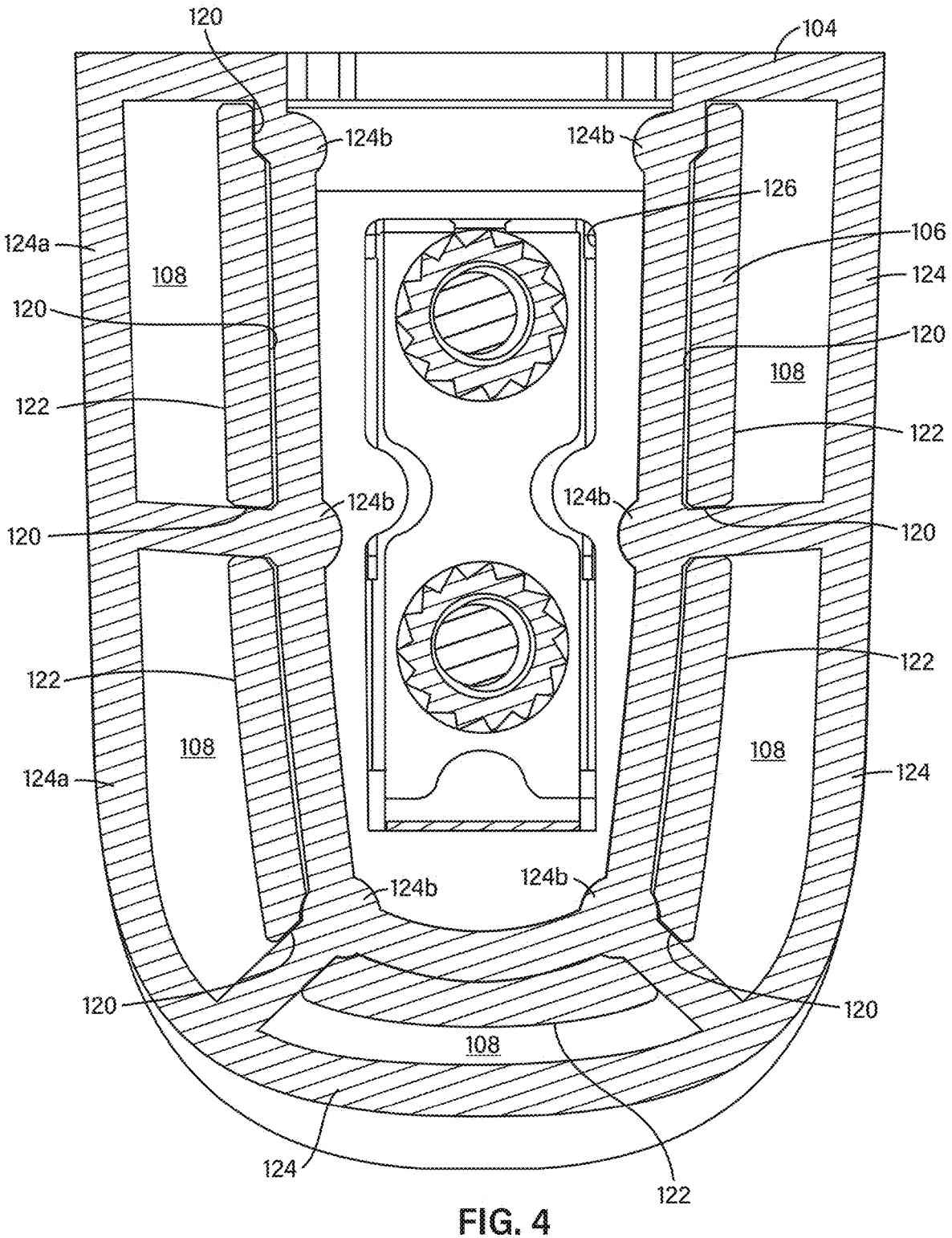
FIG. 4 is a cross-sectional view of the fluidic tactile sensor shown in FIG. 1 taken along line 4-4 as shown in FIG. 2B.

The core 102 includes a network of interconnected channels 120 formed in the outer core portion 106. The channels 120 can have an undercut profile (e.g., a dovetail profile). Portions 104a of the elastic skin 104 extend into and engage the channels 120, as shown in FIGS. 3 and 4, forming isolated enclosed volumes corresponding to the volumes of the cells 108. Seals can be formed at the interfaces between the elastic skin 104 and the channels 120 to substantially prevent leakage of the fluid medium 110 from the cells or fluid migration between the cells 108. In some examples, the seals can be formed by disposing a sealing material having sealing and bonding properties (e.g., epoxy resin) between the elastic skin 104 and the walls of the channels 120.

Figure 6A:
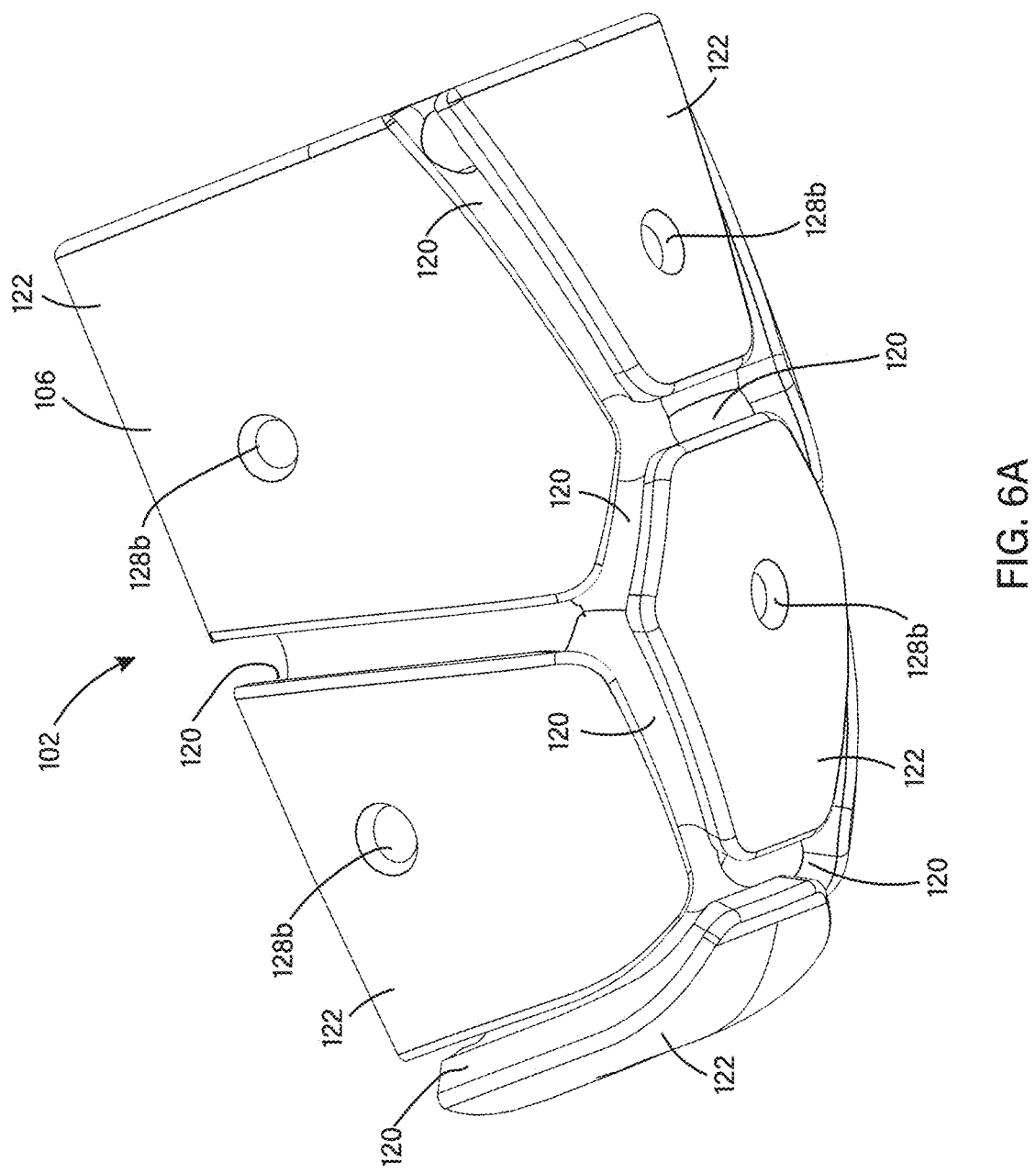
FIG. 6A is a rotated perspective view of the core shown in FIG. 5.
Figure 6B:
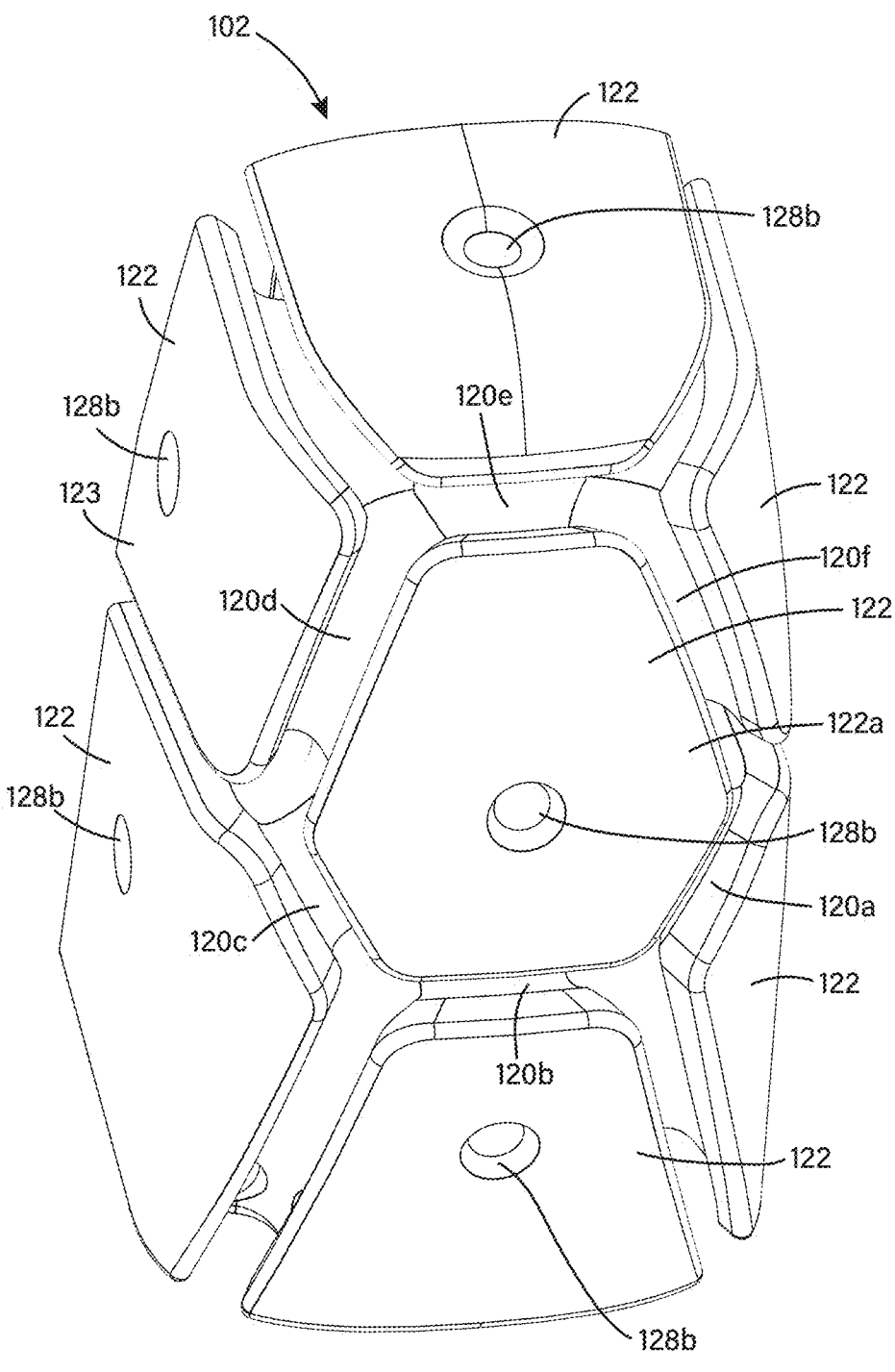
FIG. 6B is another rotated perspective view of the core shown in FIG. 5.

In some examples, as shown in FIGS. 5-6B, the network of interconnected channels 120 segments the outer core portion 106 into multiple facets 122. In the illustrated example, the outer core portion 106 includes seven facets 122. In other examples, the outer core portion 106 can have fewer or greater than seven facets 122. In general, the number of facets 122 can correspond to the number of cells 108. In the illustrated example, the facets 122 have polygonal shapes. In other examples, one or more of the facets 122 can have non-polygonal shapes (e.g., circular or oval shapes). In the illustrated example, the facets 122 are arranged in a honeycomb pattern (see FIG. 6B). In other examples, the facets 122 can be arranged in a different pattern (e.g., a regular grid). The outward facing surfaces 123 of the facets 122 can be flat or curved outwardly. The surface areas of these outwardly facing surfaces 123 can be different across the facets, as illustrated, or can be the same across the facets.

The perimeter of each facet 122 is surrounded by a subnetwork of the channels 120. For example, a given facet 122a in FIG. 6B is surrounded by channels 120a-f. When a portion 124b of the elastic skin 104 extends into the subnetwork of channels, an enclosed volume is formed between the given facet 122a and the elastic skin 104, as shown in FIG. 4. Each enclosed volume formed at each facet 122 corresponds to a cell 108. In some examples, as illustrated in FIG. 3, each given cell 108a can have a first boundary formed by a given facet 122a, a second boundary formed by a first skin portion 124a of the elastic skin 104 in opposing relation to the given facet 122a, and a third boundary formed by a second skin portion 124b of the elastic skin 104 extending into the subnetwork of channels 120 surrounding the given facet 122a. Adjacent cells 108 have a common channel 120 between them. As a result, adjacent cells 108 share the third boundaries formed by extension of the second skin portions 124b of the elastic skin 104 into the channels 120.

In some examples, as shown in FIGS. 5-7B, the core 102 can include a chamber 126 formed in the inner core portion 114. Pockets 130 can be formed in the inner core portion 114 and disposed at spaced locations along a wall of the chamber 126. The core 102 can include channels 128 extending from the pockets 130 to the outer core portion 106. The channels 128 can have first openings 128a connected to the pockets 130 and second openings 128b on the facets 122.

Each cell 108 having a facet 122 as a boundary is connected to a corresponding channel 128 via the second opening 128b of the channel on the facet. As shown in FIG. 3, the fluid medium 110 in the cell 108 extends into the channel 128 to form a column of fluid in the channel 128. In some examples, the pressure transducers 112 are recessed from the cells 108. For example, the pressure transducers 112 are disposed in the pockets 130 formed in the inner core portion 114. In some examples, the pressure transducers 112 are exposed to the columns of fluid in the corresponding channels 128 via the first openings 128a that are connected to the pockets 130. Since the column of fluid in a given channel 128 is connected to the fluid medium 110 in the corresponding cell 108, the pressure transducer 112 exposed to the column of fluid in the given channel 128 can measure fluid pressure changes in the corresponding cell 108.

In some examples, as shown in FIG. 3, a flexible circuit board 132 can be disposed within the chamber 126. The flexible circuit board 132 can have a shape that conforms to an inner wall 127 of the chamber 126 such that portions of the flexible circuit board 132 extend over and cover the pockets 130. In some examples, the pressure transducers 112 can be attached to the portions of the flexible circuit board 132 extending over the pockets 130 such that the pressure transducers 112 are positioned in the pockets 130 by conforming the flexible circuit board 132 to the inner wall 127 of the chamber 126.

The flexible circuit board 132 can communicate with the pressure transducers 112 (e.g., provide power to one or more sensors in the pressure transducers and receive signals from the sensors). An end portion 132a of the flexible circuit board 132 can extend outside of the chamber 126 for connection to an external circuit. In some examples, the pressure transducer 112 can be a barometric pressure transducer. In some examples, the pressure transducer 112 can include a strain gauge attached to a flexible membrane or diaphragm. The pressure transducer 112 can be mounted in the pocket 130 such that the fluid medium 110 in a corresponding cell 108 can exert pressure on the membrane through the corresponding channel 128. Fluid pressure on the membrane deforms the strain gauge, causing a change in the resistance of the strain gauge, which is converted to an output signal corresponding to a pressure measurement. In some examples, temperature readings from a temperature sensor can be used for thermal compensation of the output of the strain gauge. In some examples, the temperature sensor may be positioned close to the pressure transducer 112 (e.g. within the same packaging).

Figure 7A:
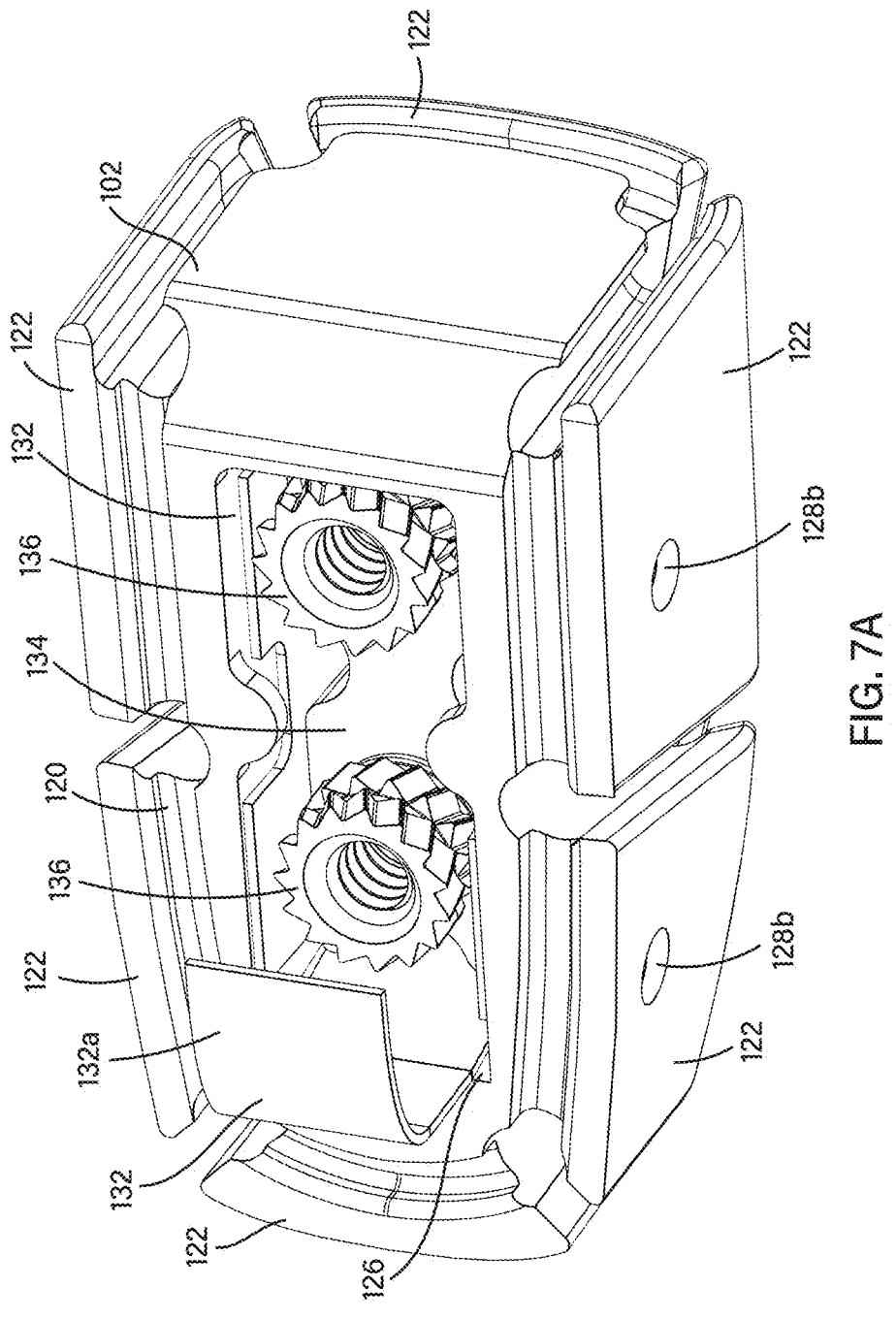
FIG. 7A is a perspective view of the fluidic tactile sensor shown in FIG. 1 without the elastic skin.
Figure 7B:
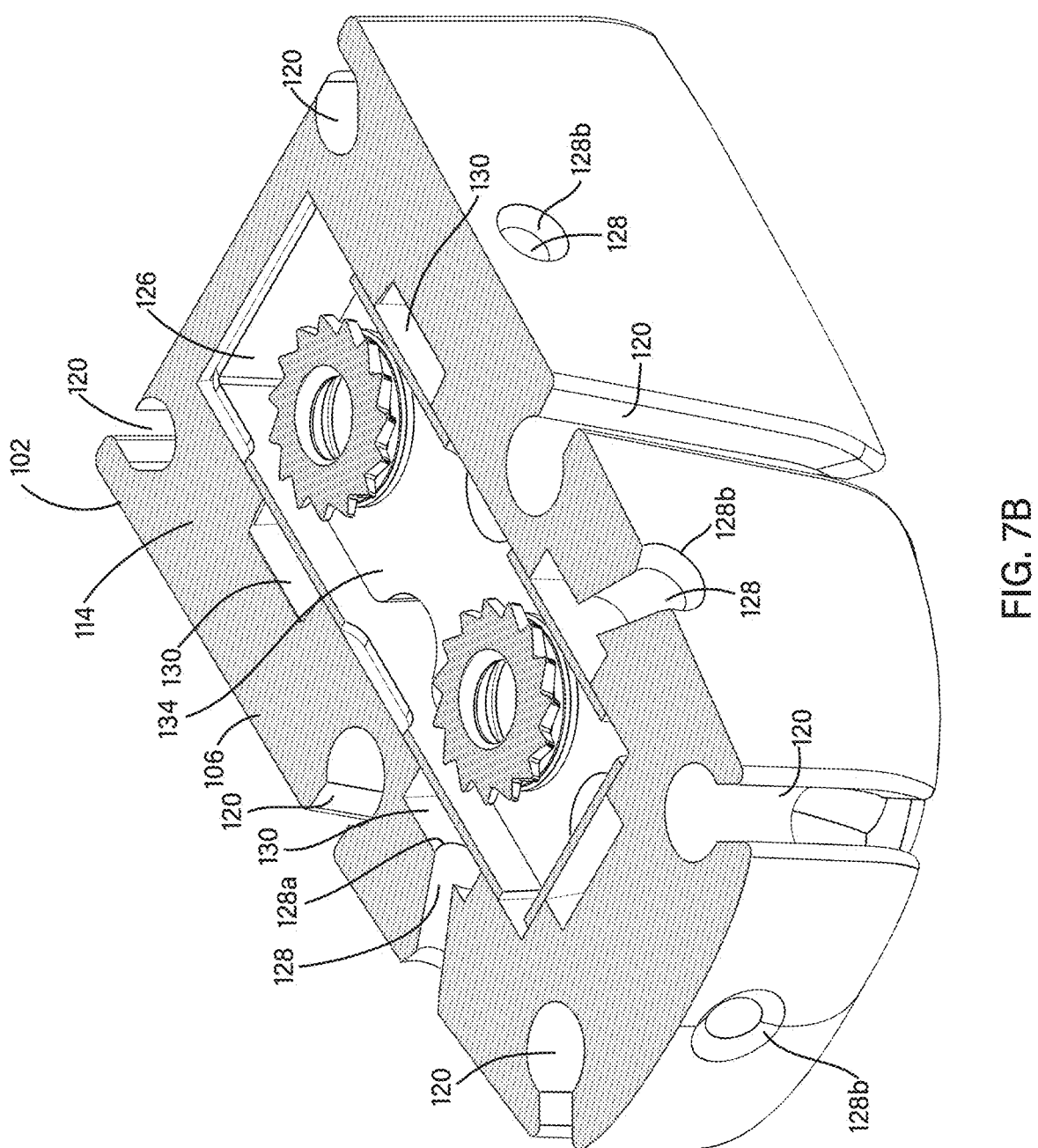
FIG. 7B is a cross-sectional view of the fluidic tactile sensor shown in FIG. 1 without the elastic skin.

In some examples, a core insert 134 can be disposed within the chamber 126, as shown in FIG. 7A. In the illustrated example, the core insert 134 is nested within a volume formed by the portion of the flexible circuit board 132 within the chamber 126. The core insert 134 can conform to the inner surface of the flexible circuit board 132 such that the flexible circuit board 132 is pinned between the core insert 134 and the inner wall 127 of the chamber 126 (see FIG. 3). The core insert 134 can include mounting portions 136 that can engage fasteners. For example, the mounting portions 136 can be nuts with internally threaded bores 136a that can receive and engage threaded bolts. The mounting portions 136 can be used to attach the fluidic tactile sensor 100 to a surface of interest.

In some examples, the chamber 126 can be sealed to prevent fluid leakage from the cells 108 via the channels 128 and chamber 126. In one example, the sealing can include filling voids in the chamber 126 not occupied by sensor structures (such as the core insert 134 and the flexible circuit board 132) with a sealing material (e.g., epoxy resin).

In some examples, the core insert 134 can include or have channels that communicate with a manifold having one or more valves that allow fluid to be injected into the cells 108 (e.g., when the fluid pressure in the cells 108 drops below a reference pressure).

When a contact force is applied to the elastic skin 104 so as to deform the elastic skin 104, a change in fluid pressure is produced inside a given cell 108 corresponding to the region in which the contact force is applied. The change in pressure in the given cell 108 may be transmitted to one or more adjacent cells 108 through the shared cell boundaries. The pressure transducers 112 can measure fluid pressure inside the cells 108. The outputs of the pressure transducers 112 can be used to determine where the contact with the elastic skin 104 is occurring and how much contact force is being applied. For example, during calibration of the fluidic tactile sensor 100, a range of pressures can be applied to the fluidic tactile sensor at different positions on the elastic skin 104 and at different angles. The outputs of the pressure transducers 112 can be recorded. A model of the fluidic tactile sensor response to applied contact force can be developed and subsequently used to characterize tactile sensing with the fluidic tactile sensor.

Example III—Robot Digit with Fluidic Tactile Sensor

Figure 8:
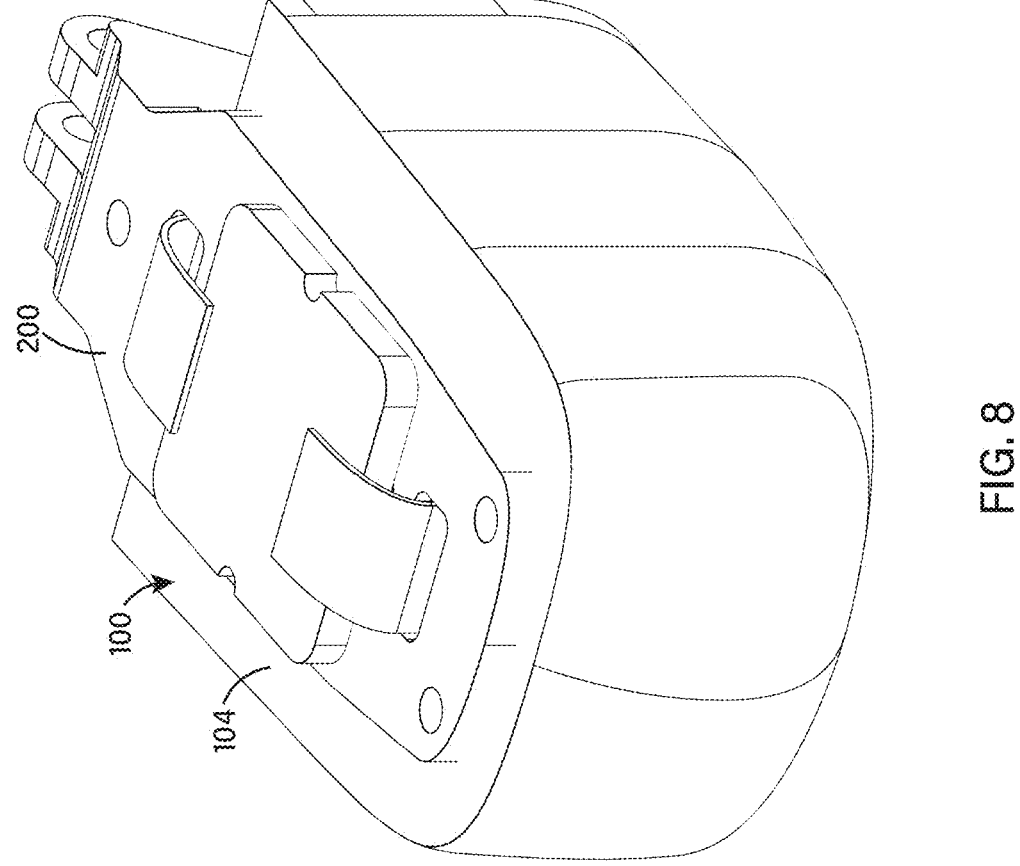
FIG. 8 is a perspective view of an assembly including the fluidic tactile sensor shown in FIG. 1 attached to a distal phalanx of a robotic digit.
Figure 9:
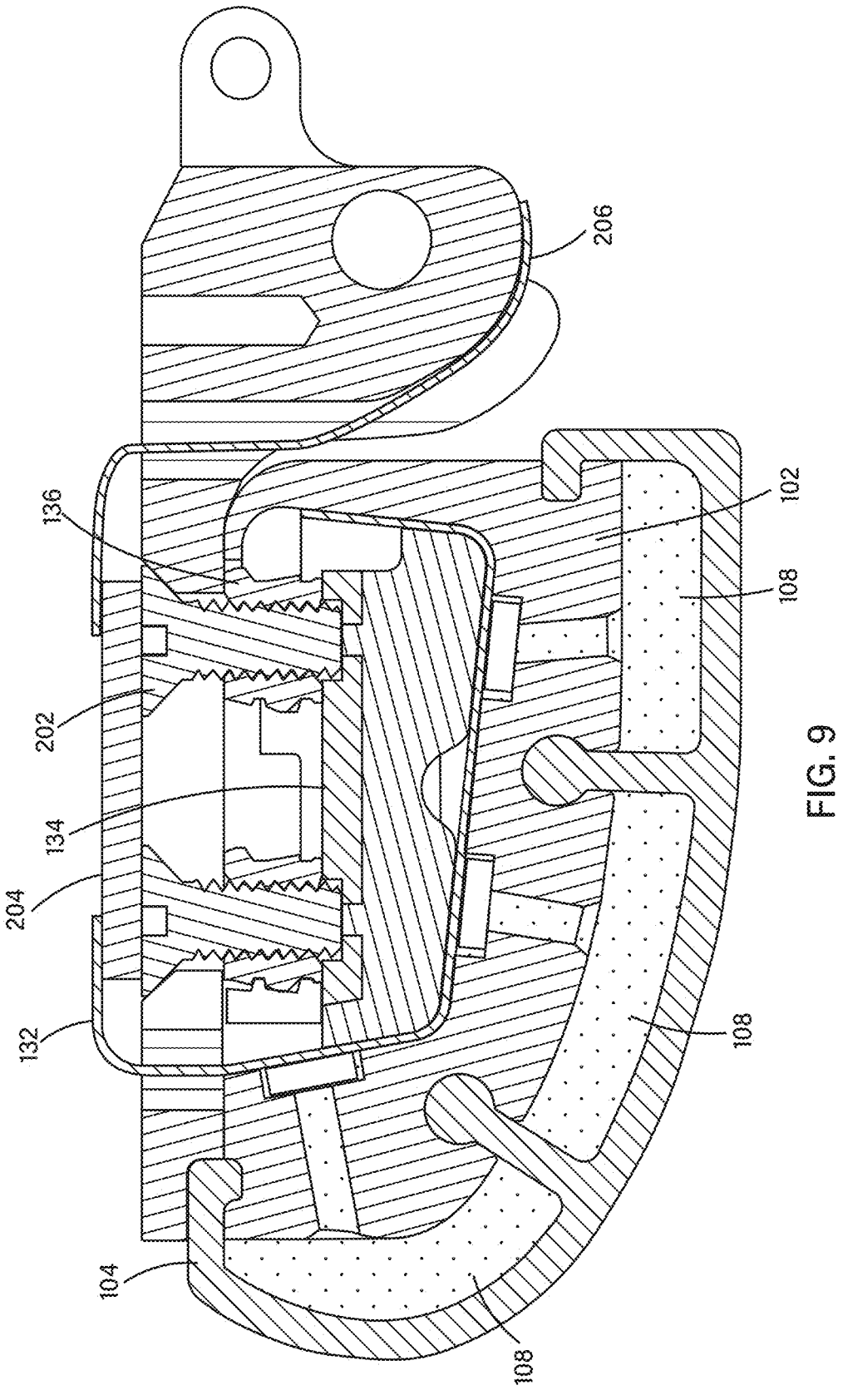
FIG. 9 is a cross-sectional view of the assembly shown in FIG. 8.

FIGS. 8-9 illustrate the fluidic tactile sensor 100 fastened to an inner surface of a distal phalanx 200 of a robotic digit (e.g., by threaded fasteners 202 engaging the mounting portions 136 of the core insert 134). The flexible circuit board 132 can be connected to a junction board 204 mounted on the distal phalanx 200. Another flexible circuit board 206 can connect the junction board 204 to a printed circuit board (not shown) on the robotic digit or robotic hand.

Figure 10:
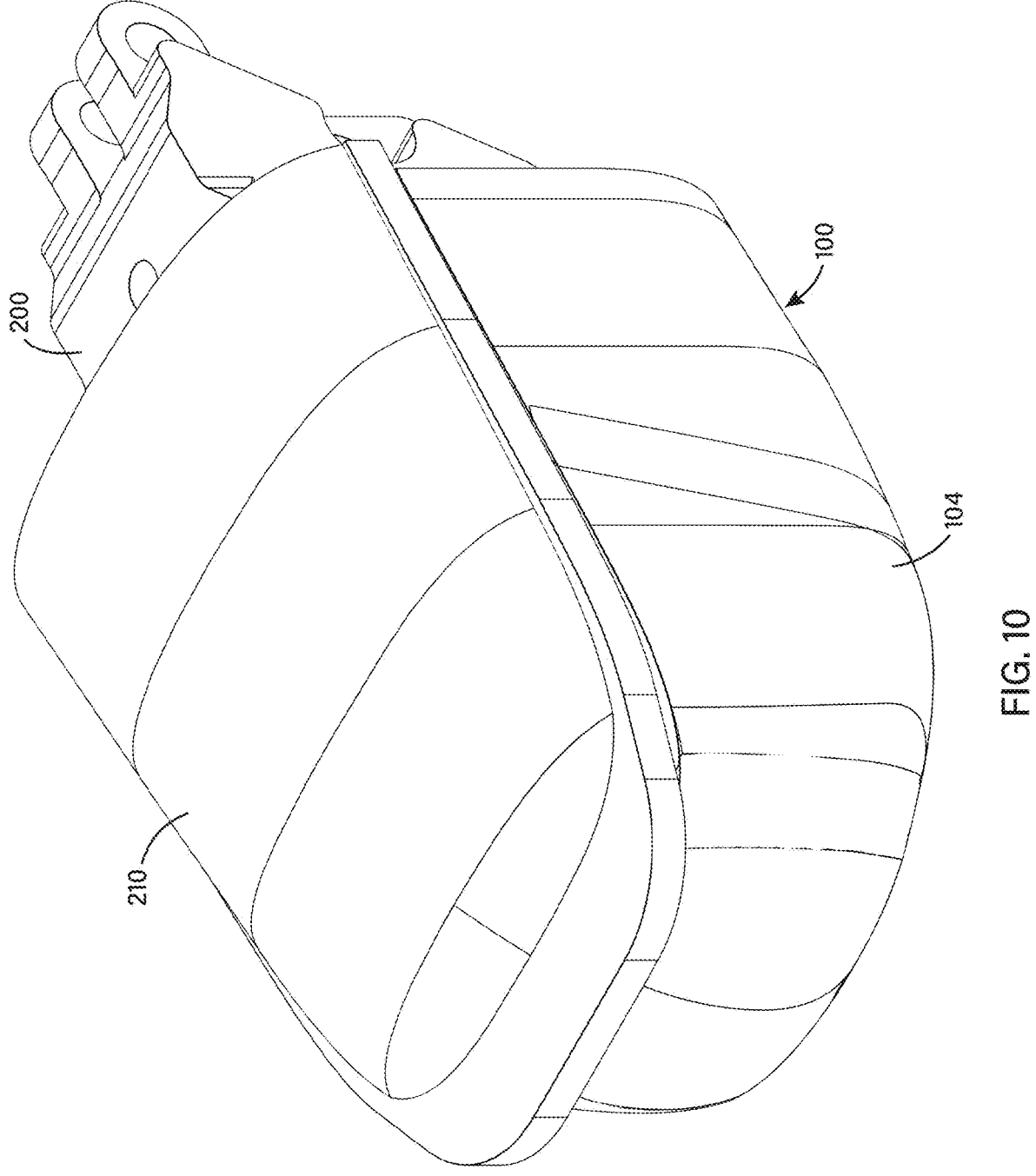
FIG. 10 is a perspective view of the assembly shown in FIG. 8 with a cover.

FIG. 10 shows a cover 210 mounted on the outer surface of the distal phalanx 200. The cover 210 extends over the junction board 204 and a portion of the elastic skin 104 extending laterally to a perimeter of the distal phalanx 200. The cover 210 or distal phalanx 200 can provide a seal for the fluidic tactile sensor and may function as a fingernail.

Example IV—Method of Manufacturing Fluidic Tactile Sensor

FIG. 11 illustrates an example method 300 of manufacturing a fluidic tactile sensor (e.g., the fluidic tactile sensor 100 described in Example II).

Figure 12A:
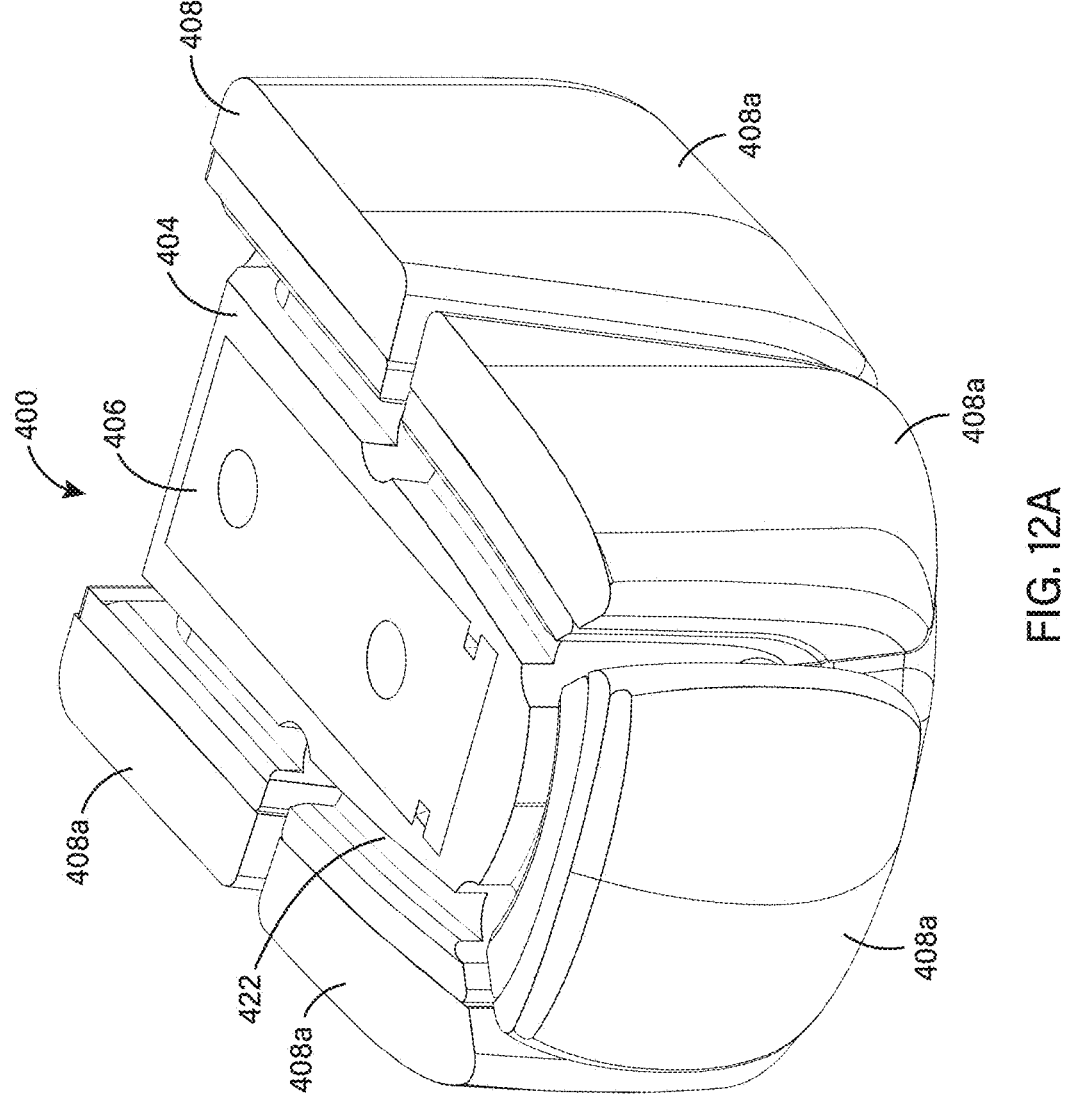
FIG. 12A is a perspective view of a mold insert.
Figure 12B:
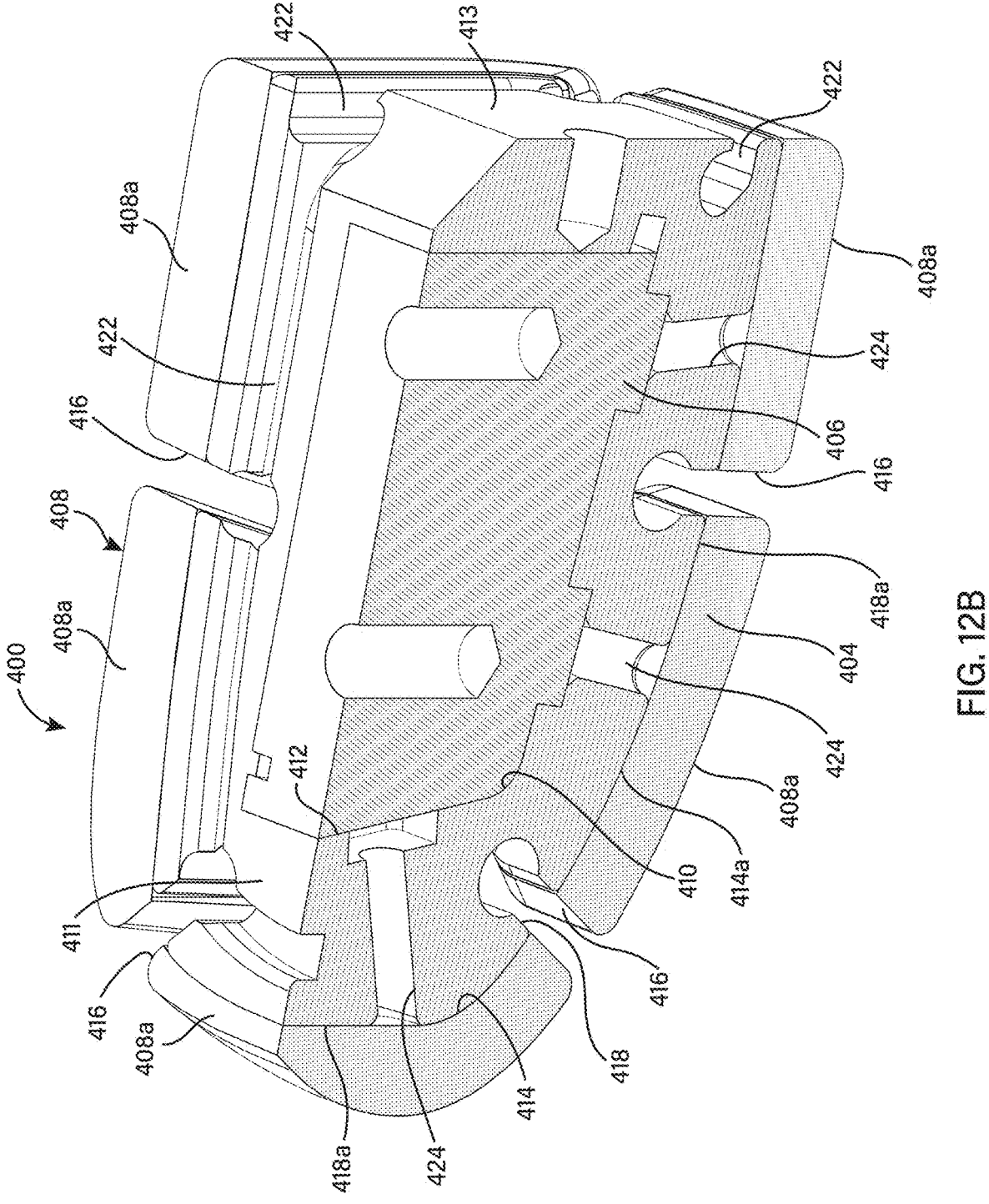
FIG. 12B is a cross-sectional view of the mold insert shown in FIG. 12A.

At 310 in FIG. 11, the method 300 includes forming a mold insert having one or more soluble parts attached to a sensor core. In one example, referring to FIGS. 12A-12B, a mold insert 400 can include a sensor core 404 having an inner surface 412 and an outer surface 414. The inner surface 412 defines a chamber 410 within the sensor core 404. The chamber 410 is open at a bottom end 411 of the sensor core 404. The mold insert 400 can include a plug insert 406 mounted within the chamber 410 and attached to the inner surface 412 of the sensor core 404. The mold insert 400 can include a skin insert 408 attached to the outer surface 414 of the mold insert 400. In some examples, the plug insert 406, sensor core 404, and skin insert 408 can be produced using multi-material 3D printing techniques (e.g. Fused Deposition Modeling, Material Jetting, and other methods familiar to those skilled in the arts), and the plug insert 406 can provide support structures to the sensor core 404 and skin insert 408.

The sensor core 404 is made of a material that is insoluble in a primary solvent. The plug insert 406 and the skin insert 408 are made of a material that is soluble in the primary solvent. In some examples, the plug insert 406 and the skin insert 408 can be made of a water-soluble polymer (e.g., a polyvinyl alcohol (PVA) material), and the sensor core 404 can be made of a water-insoluble polymer (e.g., polylactic acid (PLA) material) or other water-insoluble material (e.g., metal) suitable for forming the core 102 of the fluidic tactile sensor 100 (see Example II). In these examples, the selected solvent can be water. In other examples, the dissolvable plug insert 406 and skin insert 408 can be made of materials such as High Impact Polystyrene that are soluble in other solvents such as Limonene and the non-dissolvable sensor core 404 can be made of materials that are not dissolvable by this solvent. Several material combinations of dissolvable, non-dissolvable, and solvents exist that are compatible with producing the mold insert 400 using 3D printing, injection molding, and other fabrication methods as familiar to those skilled in the arts.

The sensor core 404 can include channel 422 formed in the bottom end 411 and the rear end 422 of the sensor core 444 and a network of interconnected channels 418 formed in a portion of the sensor core 404 including the outer surface 414. The network of interconnected channels 418 partitions the outer surface 414 into a plurality of sensor core surface segments 414a (corresponding to the facets 122 in Example II). The sensor core surface segments 414a can be arranged in any suitable pattern (e.g., honeycomb pattern). The channels 422 and 418 form attachment points for an elastic skin that will be molded over the mold insert 400.

The skin insert 408 includes a network of interconnected channels 420 having a pattern that matches that of the network of interconnected channels 418 of the sensor core 404. The network of interconnected channels 420 partitions the skin insert 408 into a plurality of skin insert segments 408a. The network of interconnected channels 420 is aligned and connected to the network of interconnected channels 418, and the skin insert segments 408a are disposed on corresponding sensor core surface segments 414a.

The sensor core 404 can include fluid channels 424 extending between the inner and outer surfaces 412, 414 of the sensor core 404 and through the wall of the sensor core 404. The openings of the fluid channels 424 at the inner surface 412 of the sensor core 404 are covered by the plug insert 406. The openings of the fluid channels 424 at the outer surface 414 of the sensor core 404 are covered by the skin insert segments 408a.

In some examples, the mold insert 400 is formed by 3D printing (e.g., fused deposition modeling), or an additive manufacturing process in general. In some examples, the plug insert 406 and the skin insert 408 are printed with a water-soluble thermoplastic material (e.g., PVA material), and the sensor core 404 is printed with a water-insoluble thermoplastic material (e.g., a thermoplastic polyester such as PLA material). The mold insert 400 can be printed using a dual extruder 3D printer that allows printing of a part using two different materials. In some examples, to avoid or reduce defects such as bubbles in the printed part, the method of 3D printing can include drying the water-soluble thermoplastic material prior to and during printing the plug insert 406 and the skin insert 408 with the material. In some examples, multiple mold inserts 400 can be printed together in a single 3D printing batch. The multiple mold inserts can be separated into individual mold inserts after printing or further processed together as a single unit.

In some examples, after printing the mold insert 400, the method can include removing material residue or printing artifacts from the printed mold insert. In examples where the plug insert 406 and the skin insert 408 are printed using a soluble thermoplastic polymer (e.g., a water-soluble thermoplastic polymer such as PVA), the material residue or printing artifacts can be removed by lightly brushing the surfaces of the printed mold insert with a solvent (e.g., water for water-soluble thermoplastic polymer). The solvent brushing may smoothen the surfaces of the plug insert 406 and the skin insert 408 as well as remove soluble residue from the open channels 418, 420, 422. The printed mold insert can be dried in an oven after solvent brushing to re-cure the plug insert 406 and skin insert 408. For example, for plug and skin inserts 406,408 made of PVA material, the printed mold insert can be dried at 40° C. for about 30 minutes, or until the PVA material is dry again. Printed artifacts in the sensor core 404 can be removed by sanding and polishing or other suitable polymer finishing processes.

Figure 12C:
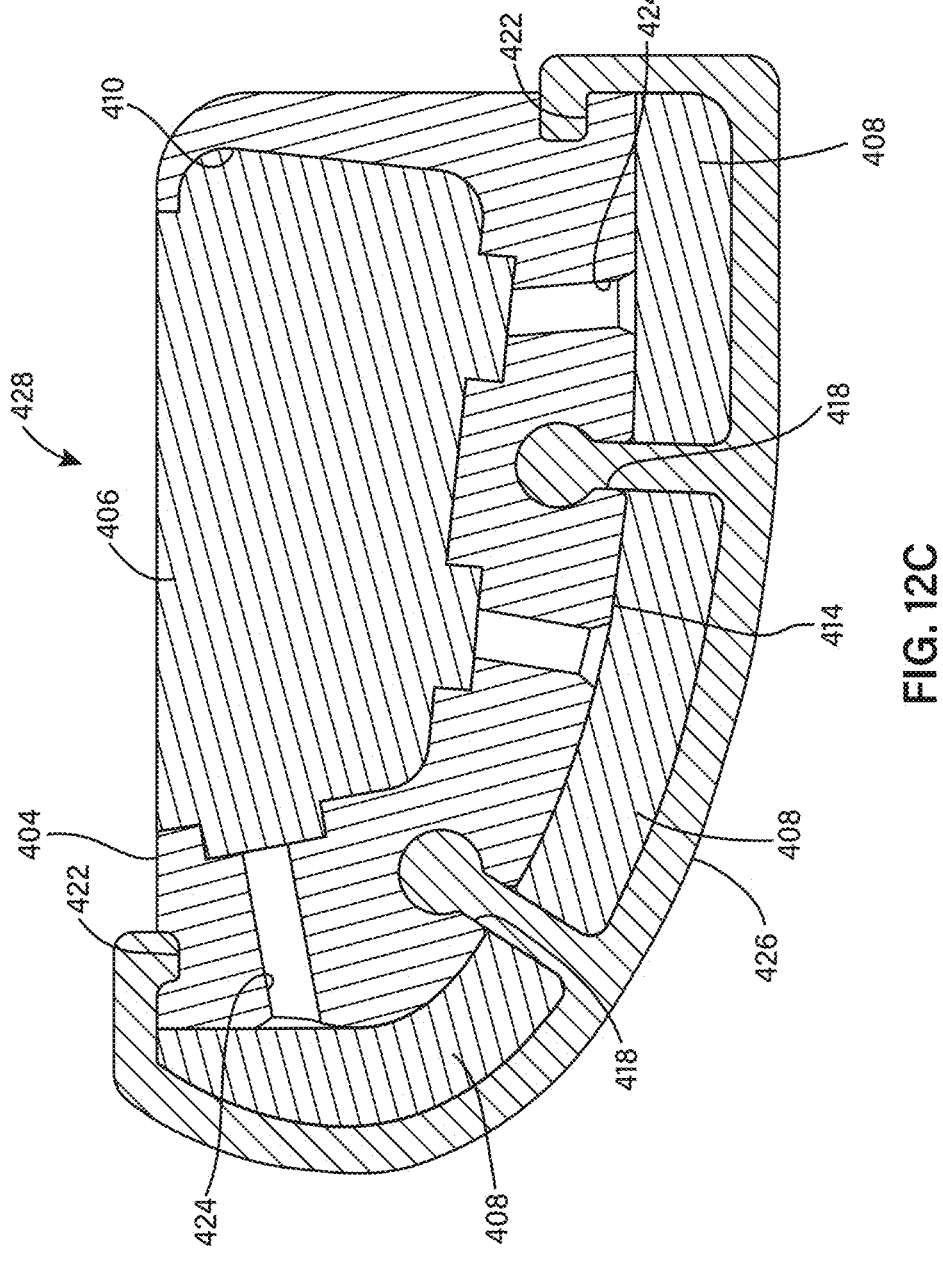
FIG. 12C is a cross-sectional view of a sensor preform.

At 320 in FIG. 11, the method 300 can include molding an elastic skin over the mold insert to form a skin insert. In one example, referring to FIG. 12C, an elastic skin 426 is molded over the mold insert 400 to form a sensor preform 428. In some examples, the elastic skin 426 can be molded over the mold insert 400 by an injection molding process (see Examples V, VI, and VII). In other examples, a process other than injection molding can be used to mold the elastic skin 426 around the mold insert 400. For example, the elastic skin 426 can be molded around the mold insert 400 by vacuum forming. In vacuum forming, a heated sheet material (e.g., a heated silicone sheet) is pulled into place on the mold insert via a vacuum. In vacuum forming, the plug insert 406 can be omitted, and the sensor core 404 (see FIG. 12B) can be provided with vacuum holes that extend from the chamber 410 to the channels 418, 420, 422 so that vacuum applied to the channels 418, 420, 422 through the chamber 410 can effectively pull the heated sheet material over the skin insert 408 and into the channels 418, 420, 422. Any excess material can be trimmed off after the sheet material has cooled down.

Prior to molding the elastic skin 426 over the mold insert 400, a chemical adhesion promoter can be applied to the sensor core 404 (especially, to the sensor core channels 418, 422 where the elastic skin 426 will engage the sensor core 404) to promote adhesion between the elastic skin material and the sensor core 404 at contact interfaces between the elastic skin and the sensor core. In some examples, the elastic skin material is silicone, and the chemical adhesion promoter can be any primer that promotes adhesion of plastic to silicone or metal to silicone (e.g., BLUESIL V-04 or V-06 silicone primer or RTV silicone primer). The chemical adhesion primer can be applied to the exposed surfaces of the sensor core 404 (especially, the core channels 418, 422) using any suitable method (e.g., dip coating or spray coating). Applying the chemical adhesion primer to the sensor core 404 can include applying the chemical adhesion primer to the entire mold insert 400 or to portions of the plug insert 406 and skin insert 408 adjacent to the sensor core 404 surfaces 412, 414. After applying the chemical adhesion primer to the sensor core 404 (or to the mold insert 400 in general), any excess chemical adhesion primer can be removed (e.g., by shaking the mold insert 400), followed by drying the mold insert 400. For BLUESIL V-04 or V-6 primer, for example, the mold insert 400 can be allowed to dry at room temperature for about one hour.

Figure 12D:
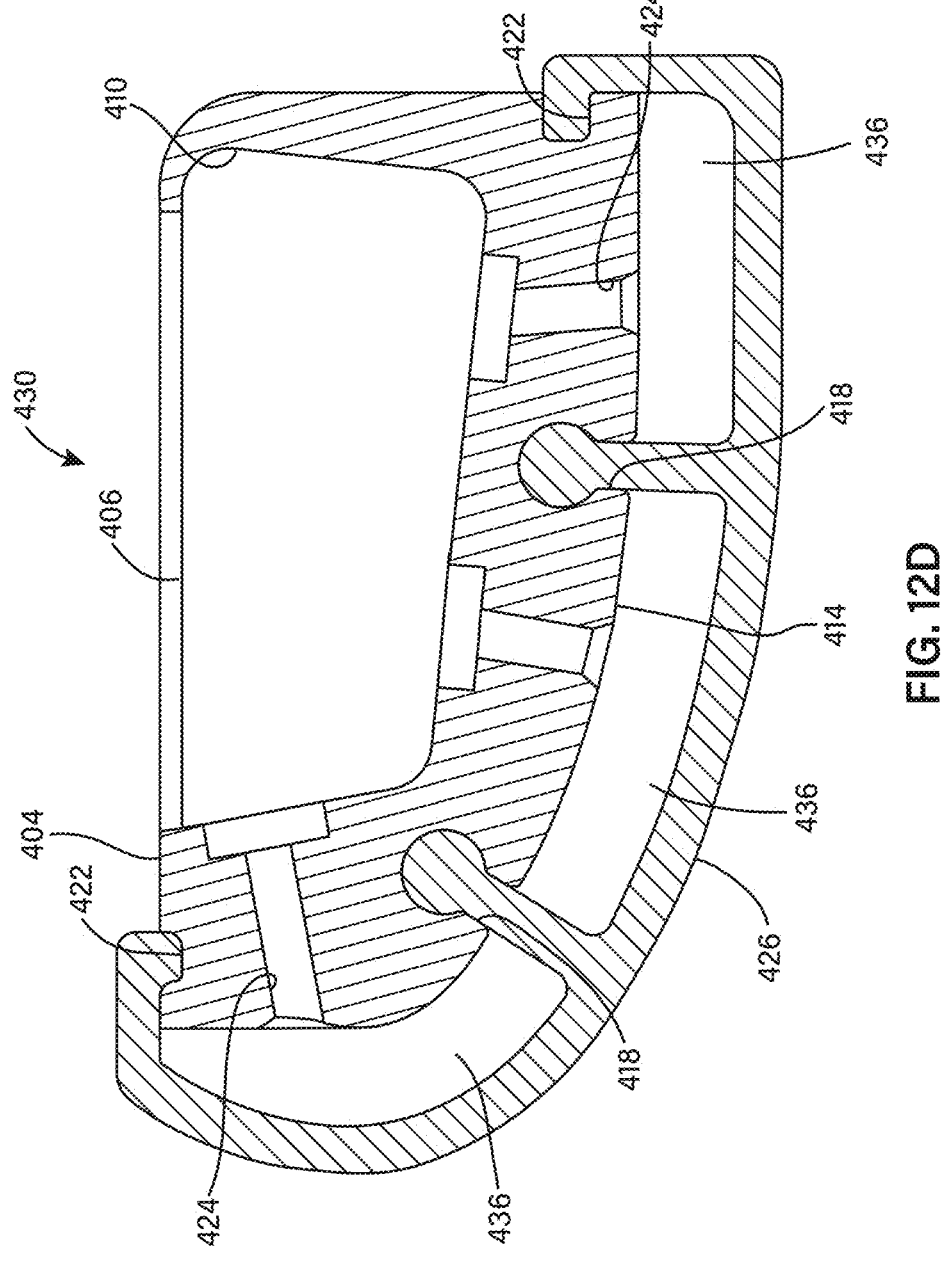
FIG. 12D is a cross-sectional view of a sensor body.

At 330 in FIG. 11, the method 300 can include removing the soluble parts of the mold insert from the sensor preform to form a sensor body with one or more cells. In one example, referring to FIG. 12D, the plug insert 406 and the mold insert 400 can be removed from the sensor preform 428 to form a sensor body 430 including only the elastic skin 426 and sensor core 404. Removal of the skin insert 408 from between the elastic skin 426 and the sensor core 404 results in cells 436 between the elastic skin 426 and the sensor core 404 that can be filled with fluid (e.g., air or other fluid described in Example II). Removal of the plug insert 406 from the chamber 410 of the sensor core 404 results in an empty chamber 410 that can receive a pressure sensing circuit.

The plug insert 406 and skin insert 408 can be removed from the sensor preform 428 by material dissolution. For example, the sensor preform 428 can be placed in a bath containing a solvent to dissolve the material of the plug insert 406 and skin insert 408. In some examples, the bath can be agitated at ultrasonic frequency to promote dissolution of the plug insert 406 and skin insert. The solvent used in the bath will depend on the material used in forming the inserts 406, 408. In examples where the inserts 406, 408 are formed of water-soluble polymer such as PVA, the solvent can be water. In another example, the inserts 406, 408 can be formed of a water-insoluble polymer such as polystyrene, and the solvent can be, for example, acetone.

The ultrasonic frequency used in agitation of the bath can be tuned to be resonant within the fluid channels 424 to improve the rate of soluble material dissolution. For example, each of the fluid channels 424 can be modeled as a closed fluid column. The fundamental frequency at which a closed cylindrical fluid column can produce resonant standing waves is given by the following expression:

$$f = \frac{NV}{4L} \tag{1}$$

where f is frequency, V is speed of sound in the solvent, and L is the length of the fluid column. The ultrasonic frequency at which the bath can be agitated can be determined using Equation (1), where f is ultrasonic frequency, V is speed of sound in the solvent, and L is the length of the fluid channel 424, and N is an odd integer, typically 1, but can be any odd integer (e.g. 1, 3, 5, etc.). In some examples, ultrasonic frequency used in the agitation process can be adaptive. For example, as material is dissolved from a fluid channel 424, the effective length of the fluid channel 424 changes. In this case, as the effective length of the fluid channel 424 changes, the ultrasonic frequency can be adjusted so that it is still tuned to be resonant for the channel. In some examples, the fluid channels 424 may have different lengths. In these examples, the agitation process can rotate through a set of ultrasonic frequencies, where each ultrasonic frequency in the set is tuned to be resonant for a particular channel.

In parallel with or separately from the solvent bath treatment, fluid jets (e.g., water jets or jets of the solvent) can be directed (e.g., using Luer lock needles and custom fixtures) into the inner chamber 410 of the sensor core 404 and into the fluid channels 424 to flush out any residues of the inserts 406, 408 within the inner chamber 410 and between the sensor core 404 and the elastic skin 426.

In some examples, the fluid jets or solvent bath can be heated to facilitate dissolution or removal of the inserts 406, 408. The temperature of the fluid jets or solvent bath can be in a safe range (e.g., above room temperature and under glass transition temperature) to prevent the possibility of damaging the sensor core 404. In one example, the sensor core 404 can be made of PLA, and the inner and skin inserts 406, 408 can be made of PVA. PLA reaches its glass transition temperature and softens at 60° C. In this case, the fluid jets or solvent bath used in removing the PVA inserts 406, 408 from the sensor core 404 can be heated to below 60° C. (e.g., 40-50° C.) to improve dissolution rate of the PVA inserts 406, 408 while avoiding damage to the PLA sensor core 404.

At 340 in FIG. 11, the method 300 can include attaching a pressure sensing circuit to the sensor core to form the fluidic tactile sensor. In one example, referring to FIG. 12E, a pressure sensing circuit 432 can include a flexible circuit board 433 (which can correspond to the flexible circuit board 132 in Example II) and pressure transducers 434

(which can correspond to the pressure transducers 112 described in Example II). The pressure sensing circuit 432 can be mounted within the chamber 410 of the sensor core 404 such that portions of the flexible circuit board 433 carrying the pressure transducers 434 extend over the openings of the fluid channels 424 at the inner surface 412 of the sensor core 404 and position the pressure transducers 434 within the fluid channels 424 (or expose the pressure transducers 434 to the fluid channels 424). Since the fluid channels 434 are connected to the cells 436, the pressure transducers 434 can sense pressure changes in the cells 436 (see Example II for additional details about pressure sensing in the cells).

Figure 12E:
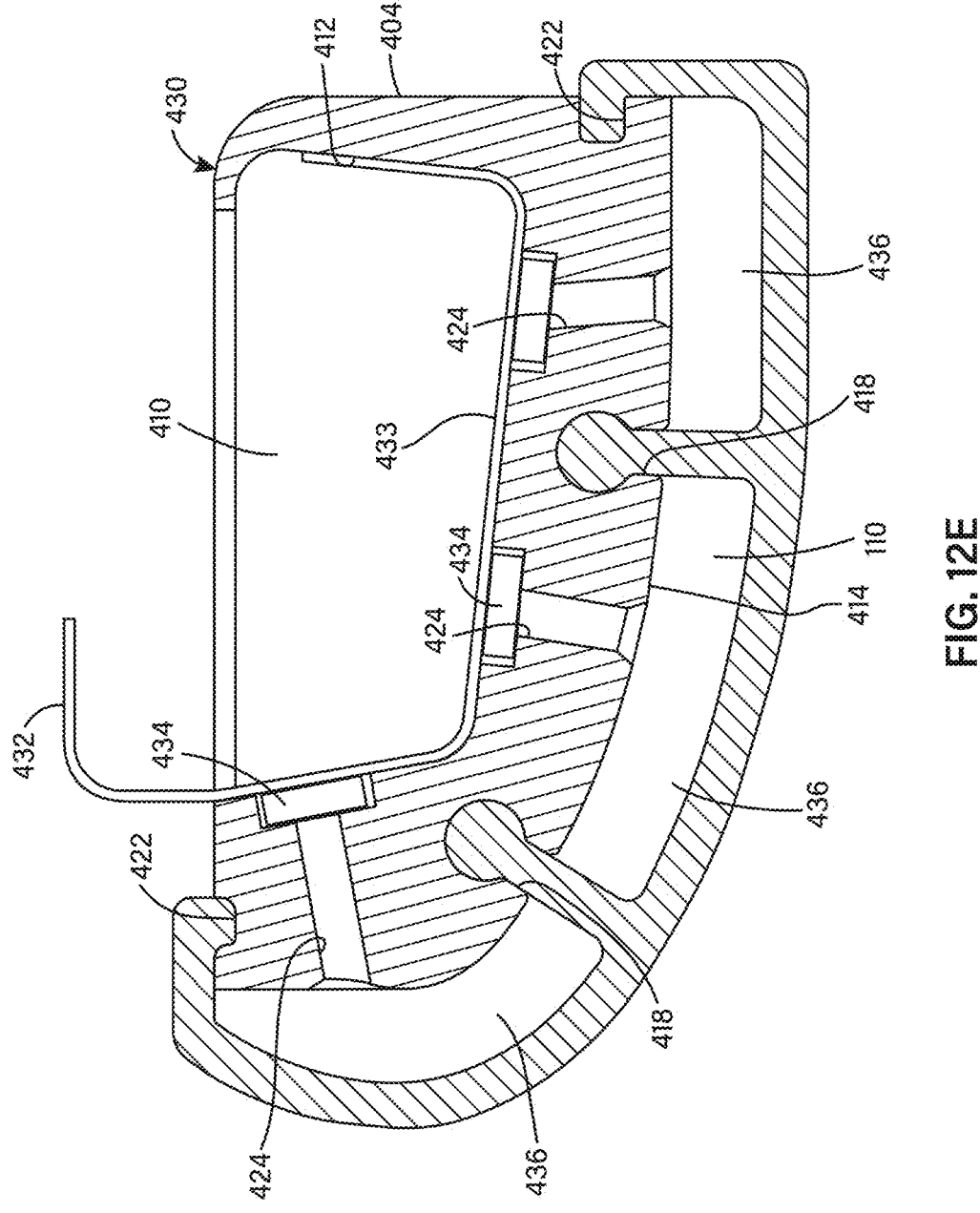
FIG. 12E is a cross-sectional view illustrating a pressure sensing circuit mounted within the sensor body of FIG. 12D.
Figure 12F:
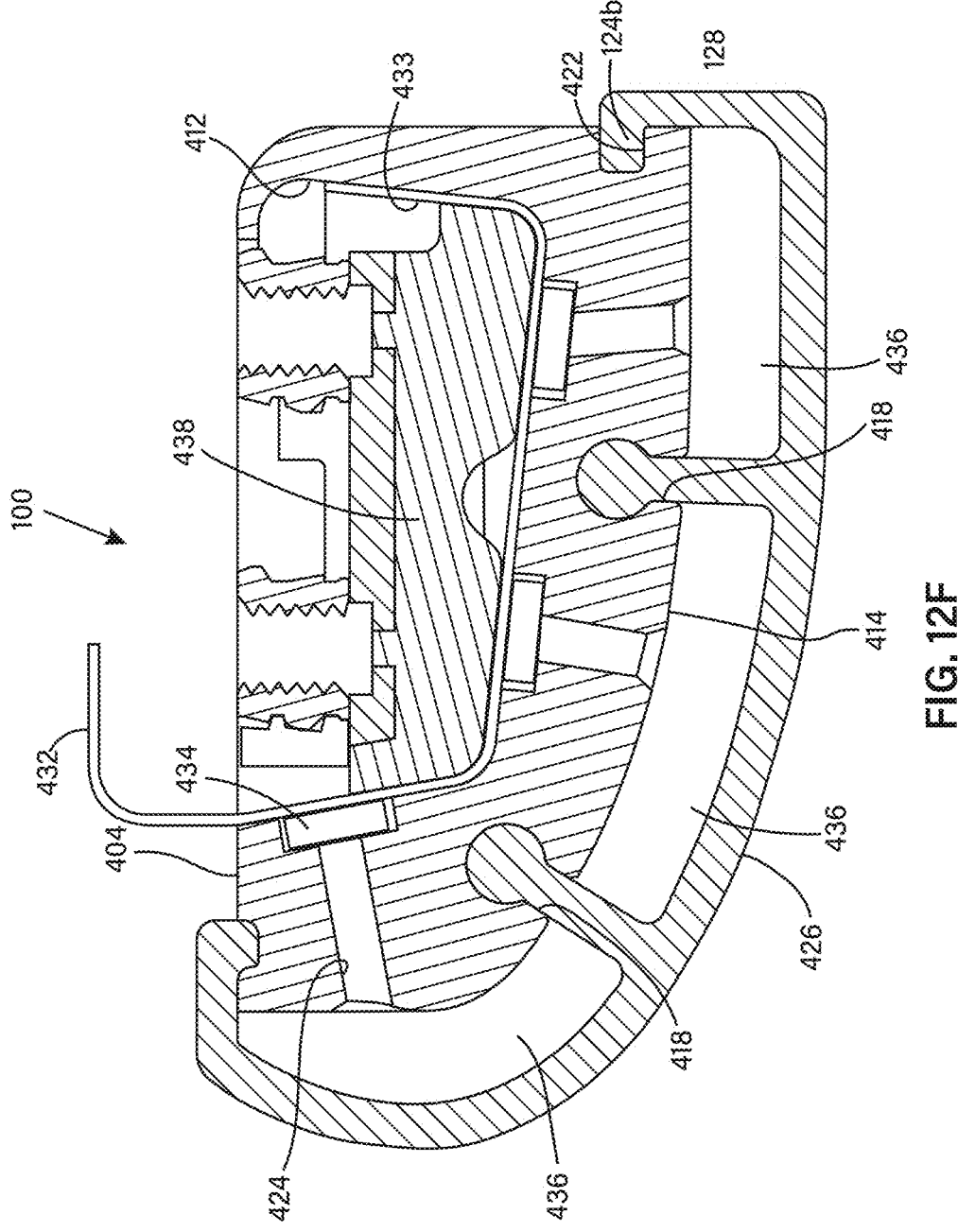
FIG. 12F is a cross-sectional view illustrating a core insert mounted within the sensing circuitry and sensor body of FIG. 12E.

In some examples, the method can include mounting a core insert 438 (corresponding to the core insert 134 in Example II) in the chamber 410, as shown in FIG. 12F. In some examples, the method can include forming the core insert 438 (e.g., as a molded or printed part) prior to mounting the core insert 428 inside the inner chamber 410. The core insert 438 can be mounted within a volume formed by the pressure sensing circuit 432 in the inner chamber 410. In some examples, the core insert 438 can frictionally engage the inner surface 412 of the sensor core 404 and the portions of the sensing circuit 432 extending along the inner surface 412 of the sensor core 404 (or can be otherwise secured within the inner chamber 410). In some examples, the core insert 438 can serve the function of pressing the sensing circuit 432 against the inner surface 412 of the sensor core 404.

At 350 in FIG. 11, the method 300 can include sealing between the pressure sensing circuit 432 and the sensor core 404 to prevent or mitigate leakages from the sensor. In one example, prior to mounting the pressure sensing circuit 432 within the chamber 410 of the sensor core 404 as shown in FIG. 12E, a potting material (e.g., epoxy resin) can be applied to the surfaces of the pressure sensing circuit 432 (in particular, at least the back surface of the flexible circuit board 433 that will contact the inner surface 412 of the sensor core 404 and housings of the pressure transducers 434). The pressure sensing circuit 432 can be pressed against the inner surface of the sensor core 404 such that the potting material after curing forms a seal between the inner surface 412 of the sensor core 404 and the pressure sensing circuit 432, including around the openings of the fluid channels 424. In some examples, the core insert 438 can be mounted within the pressure sensing circuit 432 as shown in FIG. 12F to apply the outward pressure that presses the pressure sensing circuit 432 against the inner surface 412 of the sensor core 404. In some examples, to seal any remaining voids in the chamber 410, the chamber 410 can be backfilled with the potting material, followed by curing the potting material. In some examples, the potting material can be a material that can be cured at room temperature or at a low temperature to minimize contraction of the elastic skin during curing.

Another method of sealing between the pressure sensing circuit 432 and the sensor core 404 can include assembling precision cut epoxy preforms on the pressure sensing circuit 432 (e.g., on the flexible circuit board 433 and housings of the pressure transducers 434) and placing the assembled pressure sensing circuit 432 and epoxy preforms in the chamber 410 of the sensor core 404 such that the pressure transducers 434 are in positions corresponding to the fluid channels 424. The entire assembly can be placed in an oven to allow the epoxy preforms to melt and create a seal between the pressure sensing circuit 432 and the sensor core

404. In one example, the assembly may be placed in the oven at approximately 130° C. for approximately 45 minutes.

Another method of sealing between the pressure sensing circuit 432 and the sensor core 404 can include applying a silicone gasket material (e.g., RTV) coating on sealing surfaces of the pressure sensing circuit 432. In some examples, RTV can be brushed onto the pressure sensing circuit 432 and partially cured (e.g., at 75% of the cure time) to allow the pressure sensing circuit 432 to be assembled into the inner chamber 410 of the sensor core 404 with minimal smearing of the RTV onto critical components. Free-from gasket material circumvents the need to have pressure applied to the sealing surfaces.

Another method of sealing between the pressure sensing circuit 432 and the sensor core 404 can include arranging O-ring seals to seal between the pressure sensing circuit 432 and the sensor core 404.

In some examples, a light coat of vacuum grease can be applied to mating faces of the pressure sensing circuit 432 to prevent air from leaking through.

In some examples, the mating faces of the sensor core 404 and pressure sensing circuit 432 are preferably smooth to improve the chances of creating an airtight seal between the sensor core and the pressure sensing circuit.

Example V—Injection Mold

Figure 13A:
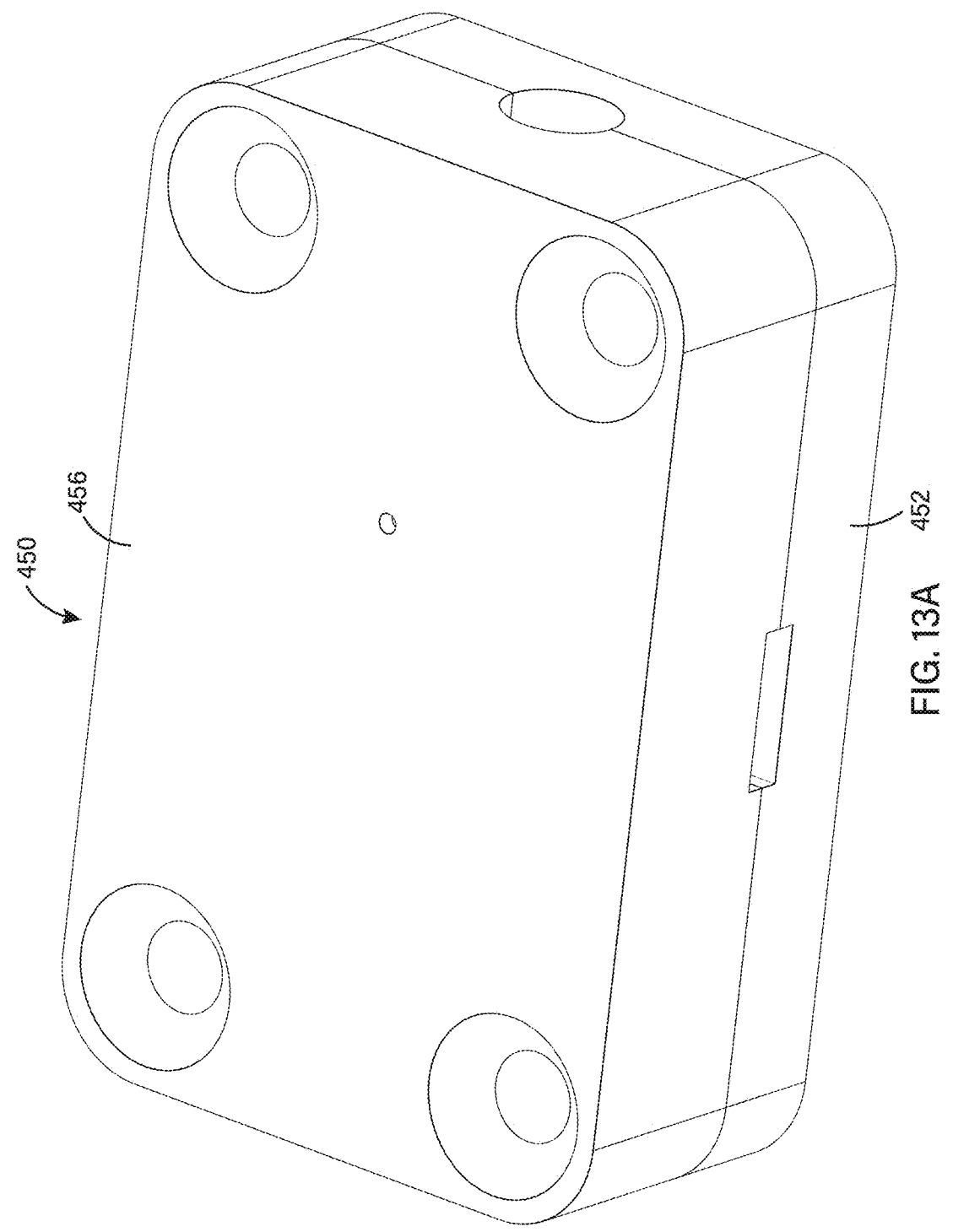
FIG. 13A is a perspective view of a mold assembly.
Figure 13B:
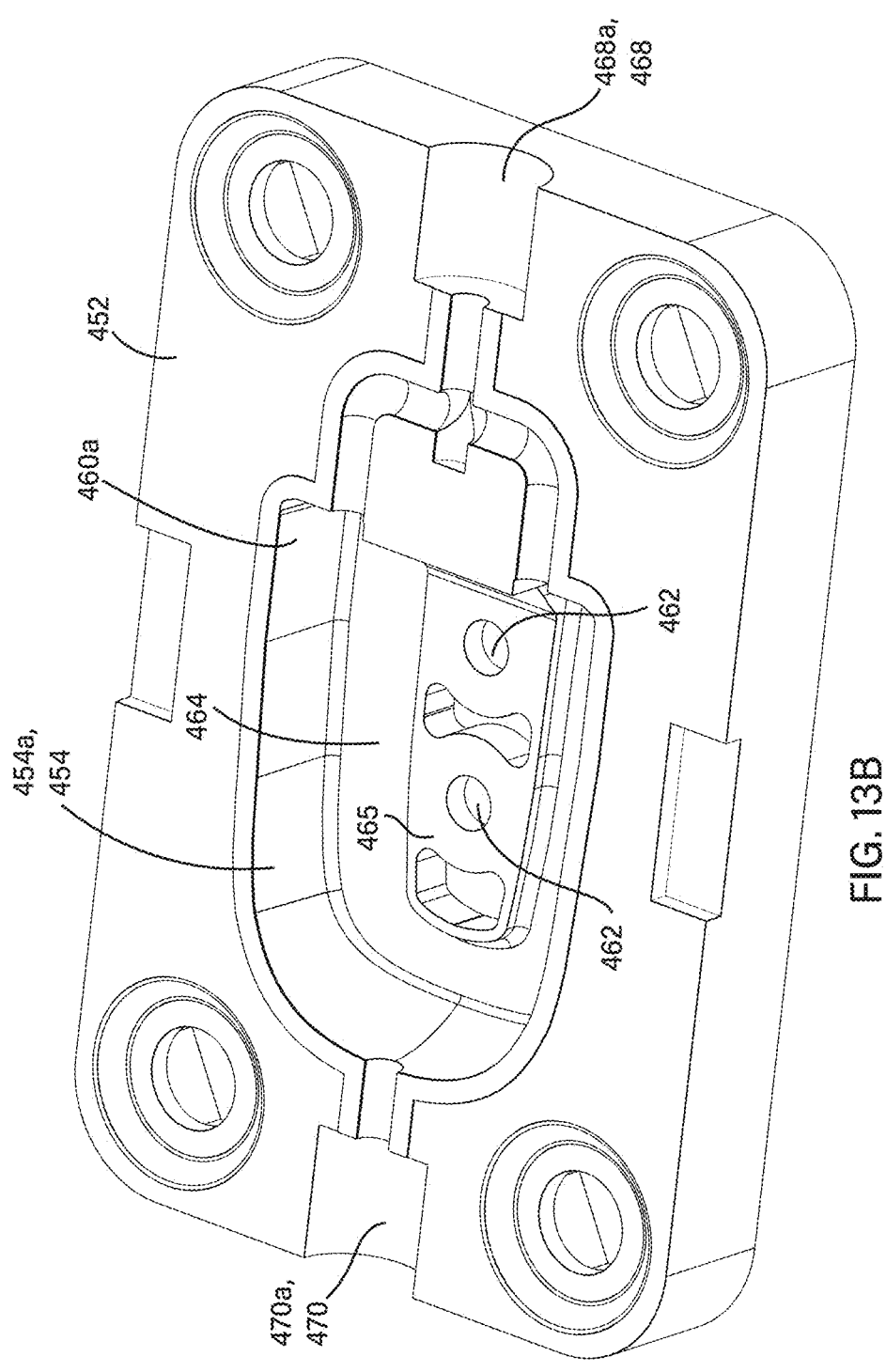
FIG. 13B is a perspective view of a bottom mold of the mold assembly of FIG. 13A.
Figure 13C:
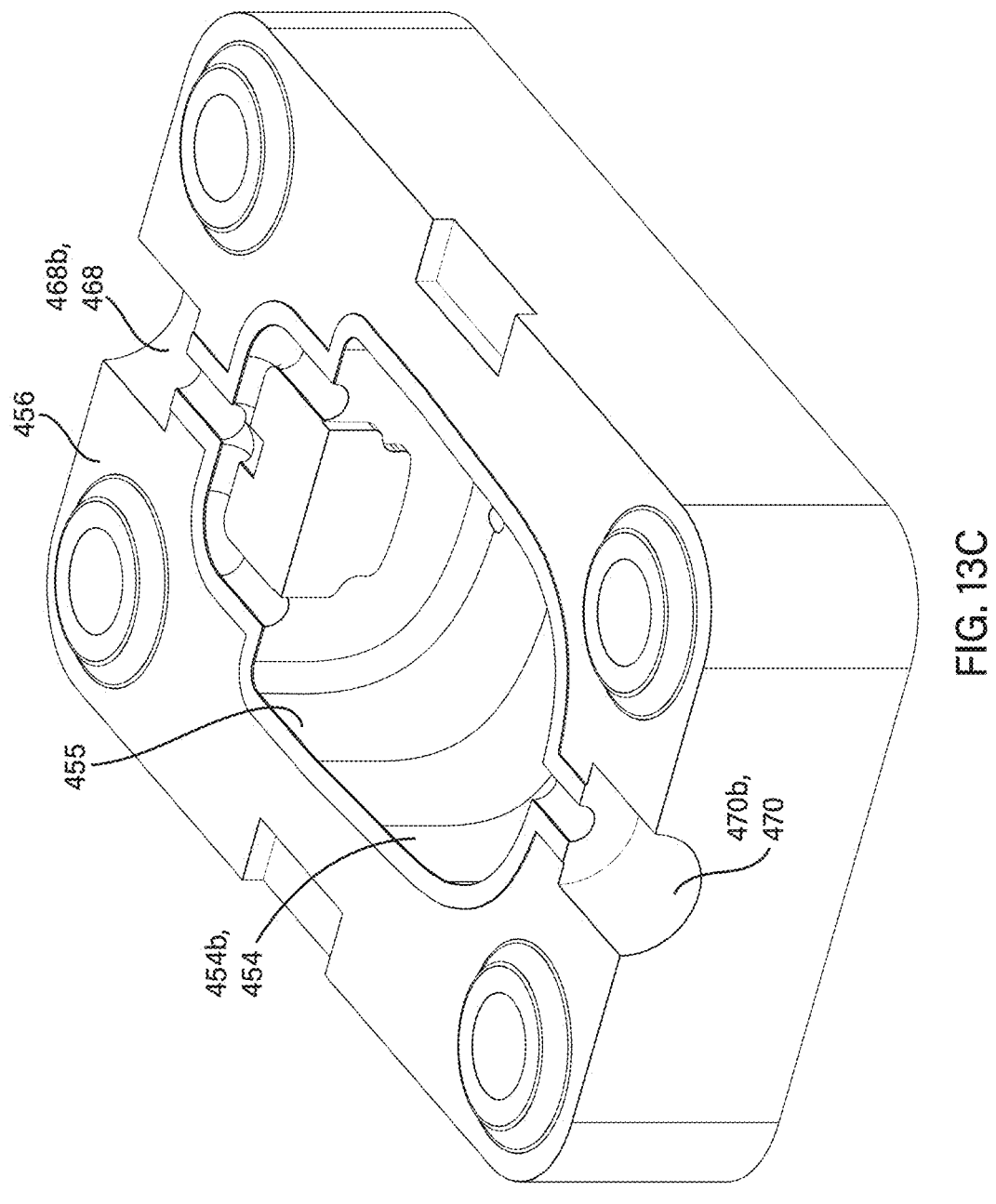
FIG. 13C is a perspective view of a top mold of the mold assembly of FIG. 13A.

FIGS. 13A-13C illustrate an example injection mold 450 that can be used for molding the elastic skin 426 over the mold insert 400 as described in Example IV.

Figure 13D:
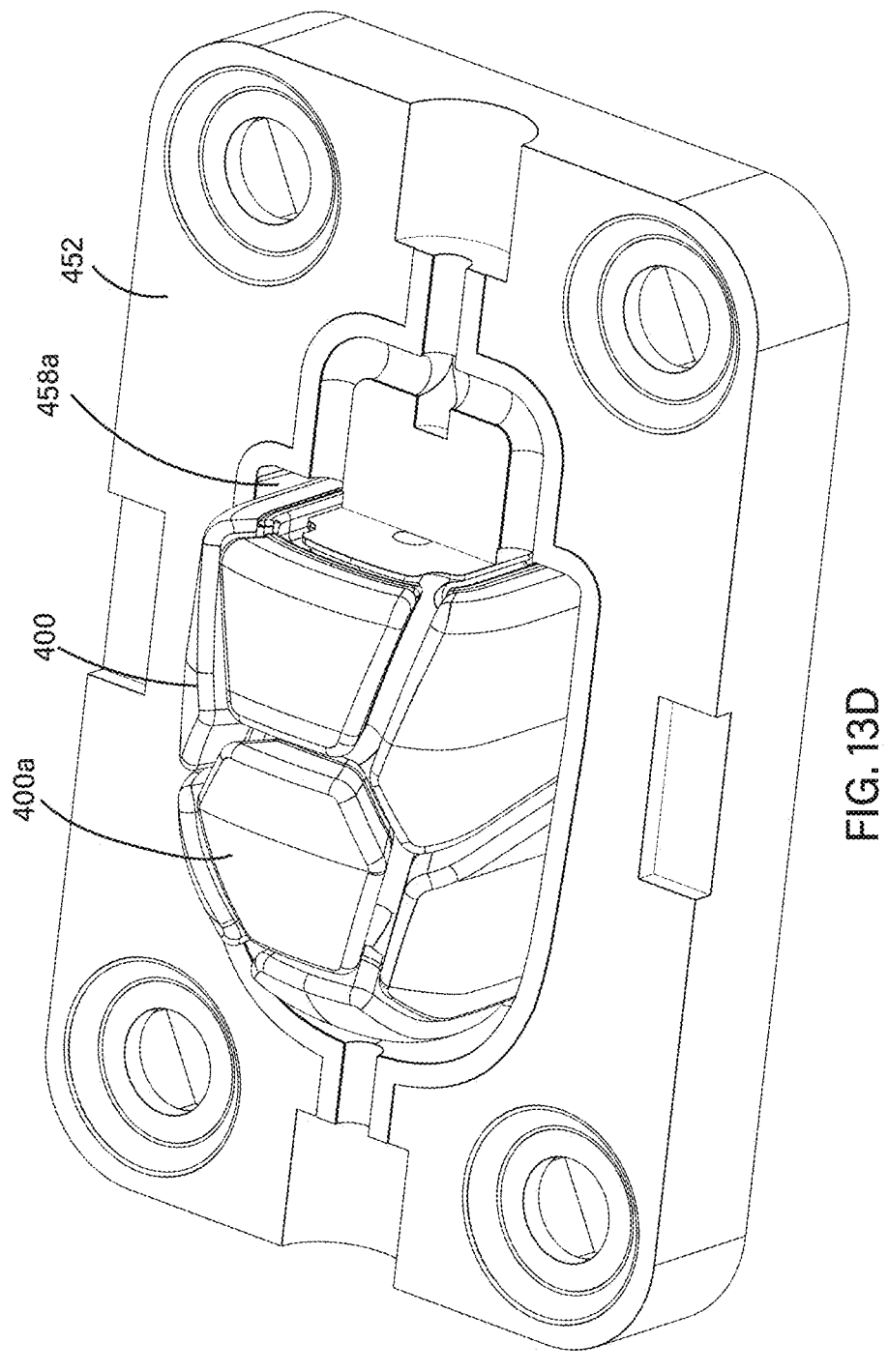
FIG. 13D is a perspective view of the bottom mold of FIG. 13B with a mold insert.
Figure 13E:
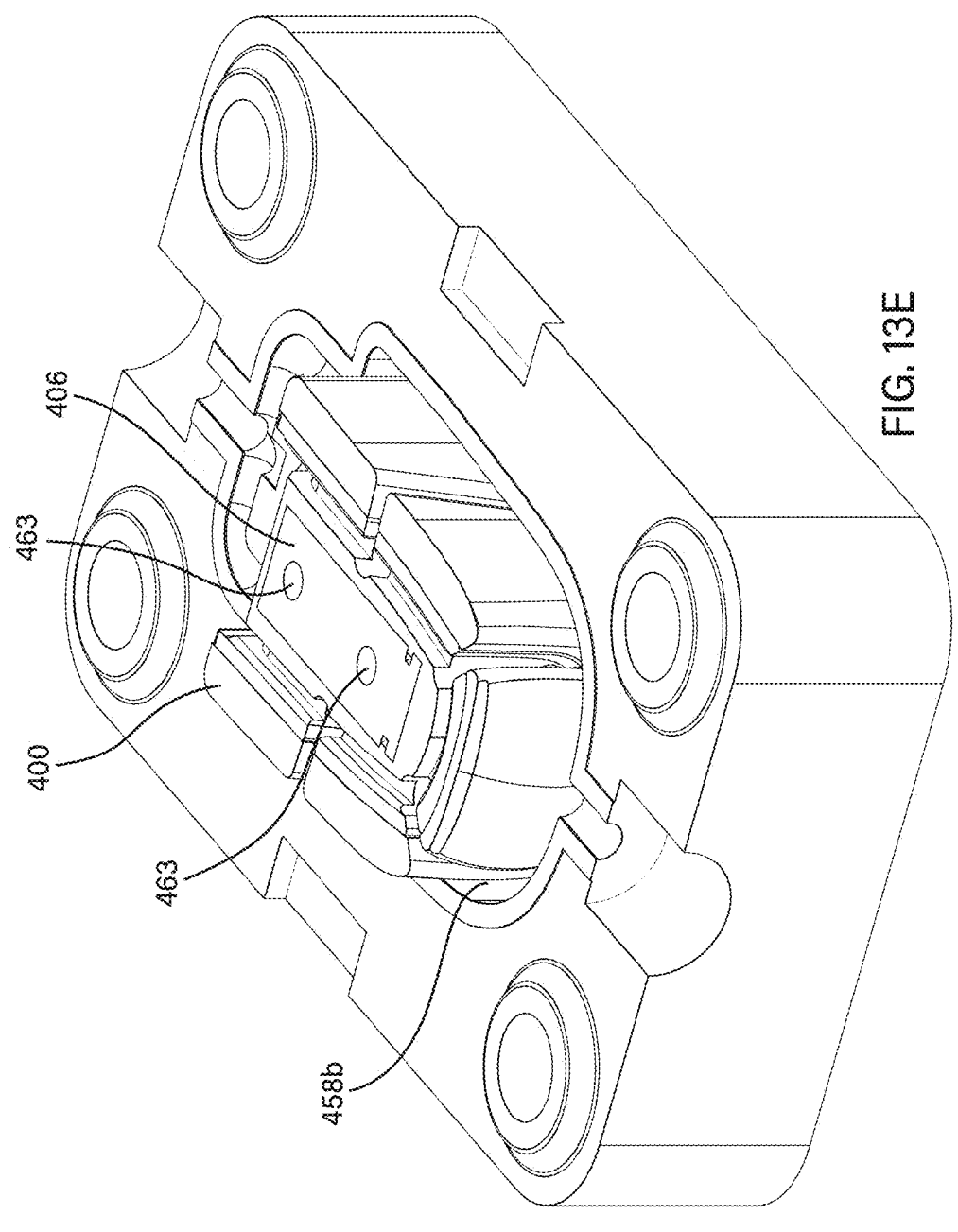
FIG. 13E is a perspective view of the top mold of FIG. 12C with a mold insert.
Figure 13F:
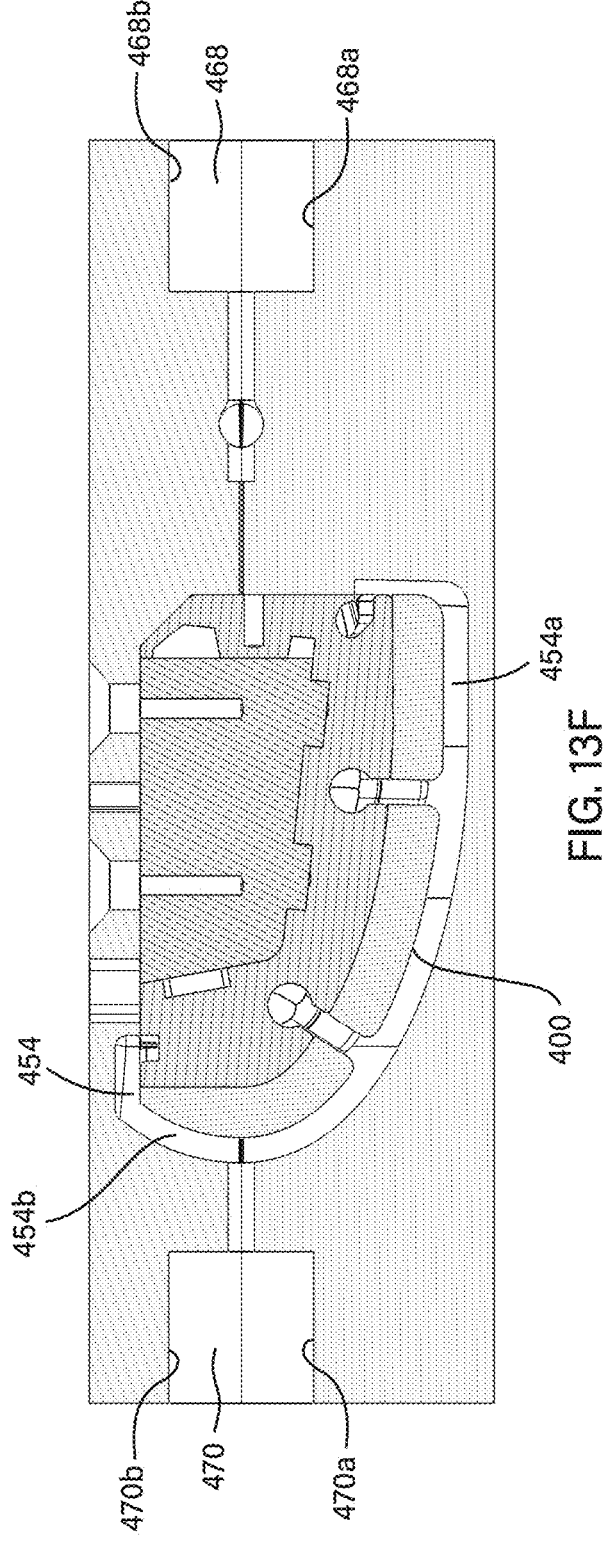
FIG. 13F is a cross-sectional view of the mold assembly of FIG. 13A with a mold insert.

The injection mold 450 can include a bottom mold 452 having a first portion 454a of a mold cavity 454 and a top mold 456 having a second portion 454b of the mold cavity 454. The mold insert 400 can be mounted inside the bottom mold cavity portion 454a, as shown in FIG. 13D, with a top portion of the mold insert 400 protruding above the bottom mold 452. The protruding portion of the mold insert 400 extends into the top mold cavity portion 454b when the bottom and top molds 452, 456 engage each other, as shown in FIG. 13F.

As shown in FIG. 13B, the bottom mold cavity portion 454a is defined by an inner side surface 460a and inner bottom surfaces 464, 465 of the bottom mold 452. The inner bottom surface 465 is raised relative to the inner bottom surface 464 (or the inner bottom surface 464 is recessed relative to the inner bottom surface 465). The bottom mold cavity portion 454a has a shape that is similar to the shape of a bottom portion of the mold insert 400. The bottom mold cavity portion 454a is oversized relative to the bottom portion of the mold insert 400 such that when the mold insert 400 is disposed inside the bottom mold cavity portion 454a and sits on the raised inner bottom surface 465, as shown in FIG. 13D, there is a space 458a in the bottom mold cavity portion 454a that surrounds the bottom portion of the mold insert 400. The space 458a can receive an injection molding material injected into the bottom mold cavity portion 454a.

In some examples, holes 462 extend through the raised inner bottom surface 465 (see FIG. 13B) to the outside bottom of the bottom mold 452. In some examples, complementary holes 463 (see FIG. 13E) are tapped into the plug insert 406 of the mold insert 400. The mold insert 400 can be mounted on the raised inner bottom surface 465 of the bottom mold 452 such that the holes 463, 462 are aligned. Fasteners can be inserted into the aligned holes 463, 462 to secure the mold insert 400 to the raised inner bottom surface 465 and ensure that the portion of the bottom of the mold insert 400 including the plug insert 406 is flush with the raised inner bottom surface 465. The aligned holes 463, 462 and fasteners inserted therein can have the additional benefit of correctly centering the mold insert 400 within the bottom mold cavity portion 454a so that an elastic skin with a uniform wall thickness can be formed around the mold insert 400.

As shown in FIG. 13C, the top mold 456 has a complementary construction to the bottom mold 452. The top mold cavity portion 454b is defined by an inner surface 455 that is shaped similarly to the top portion 400a of the mold insert 400 that protrudes from the bottom mold 452 (see FIG. 13D). The top mold cavity portion 454b is larger than the top portion 400a of the mold insert 400 such that when the top portion 400a is received in the top mold cavity portion 454b, there is a space 458b (see FIG. 13E) within the top mold cavity portion 454b that surrounds the top portion of the mold insert 400. The space 458b can receive an injection molding material injected into the top mold cavity portion 454b.

As shown in FIG. 13B, a first portion 468a of an injection port 468 is formed in the bottom mold 452 and connected to the bottom mold cavity portion 454a. As shown in FIG. 13C, a second portion 468b of the injection port 468 is formed in the top mold 456 and connected to the top mold cavity portion 454b. When the top mold 456 is engaged with the bottom mold 452, as shown in FIG. 13F, the first and second injection port portions 468a, 468b combine to form a single injection port 468, which can be used to inject an injection molding material into the mold cavity 454 formed by the bottom mold cavity portion 454a and the top mold cavity portion 454b.

As shown in FIG. 13B, a first portion 470a of a bleed port 470 is formed in the bottom mold 452 and connected to the bottom mold cavity portion 454a. As shown in FIG. 13C, a second portion 470b of the bleed port 470 is formed in the top mold 456 and connected to the top mold cavity portion 454b. When the top mold 456 is engaged with the bottom mold 452, as shown in FIG. 13F, the first and second bleed port portions 470a, 470b combine to form a single bleed port 470, which can be used to bleed excess injection molding material out of the mold cavity 454. The bleed port 470 and injection port 468 can be at opposite ends of the injection mold 450.

The injection mold 450 can be made using any suitable process, such as by additive manufacturing (e.g., stereolithography (SLA) printing)) or machining. The injection mold 450 is illustrated as having a single cavity 454 that can hold a single mold insert 400. In other examples, the injection mold 450 can have multiple cavities to hold multiple mold inserts. For example, each of the top and bottom molds 452, 456 can have an array of mold cavity portions that can receive an array of mold inserts, which can allow multiple parts to be molded in a single molding process.

Preparation for forming the elastic skin around the mold insert can include loading the mold insert 400 inside the bottom mold cavity portion 454a and fastening the mold insert 400 to the inner bottom surface 465 of the bottom mold 452. After securing the mold insert 400 to the bottom mold 452, the top mold 456 can be mounted on the bottom mold 452 such that the mold insert 400 is encapsulated in the mold cavity 454 formed between the bottom mold 454 and the top mold 456. The bottom and top molds 452, 456 can be attached together using any suitable means (such as by holes formed in the molds that can receive fasteners or by clamping).

Figure 13G:
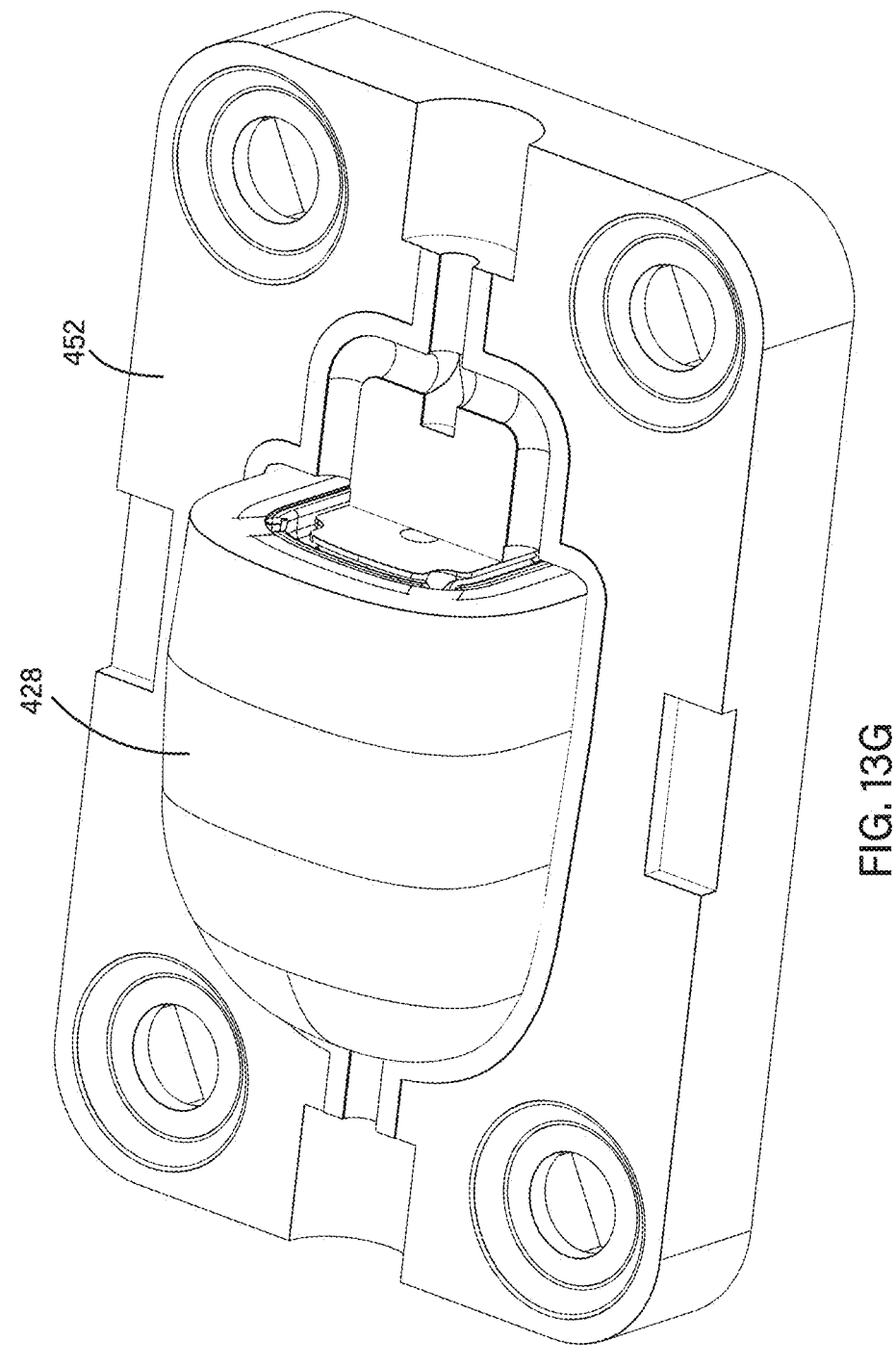
FIG. 13G is a perspective view of the bottom mold of FIG. 13B with a sensor preform.

To form the elastic skin, an injection molding material can be injected into the mold cavity 454 through the port 468. The injecting molding resin can be a material suitable for forming the outer elastic skin 104 (see Example II). In some examples, the injecting molding resin can be a silicone material (e.g., a silicone material that is clear or translucent at room temperature). The injection molding material injected through the port 468 into the mold cavity 454 fills the spaces around the mold insert 400. After spaces have been filled with the injection molding material, the injected resin is allowed to cure within the mold cavity. After the injected resin has cured, the top mold 456 can be removed from the bottom mold 452, as shown in FIG. 13G, followed by removing the molded part (corresponding to the sensor preform 428 in Example IV) from the bottom mold 452.

Example VI—Vacuum Injection Molding System

Figure 14A:
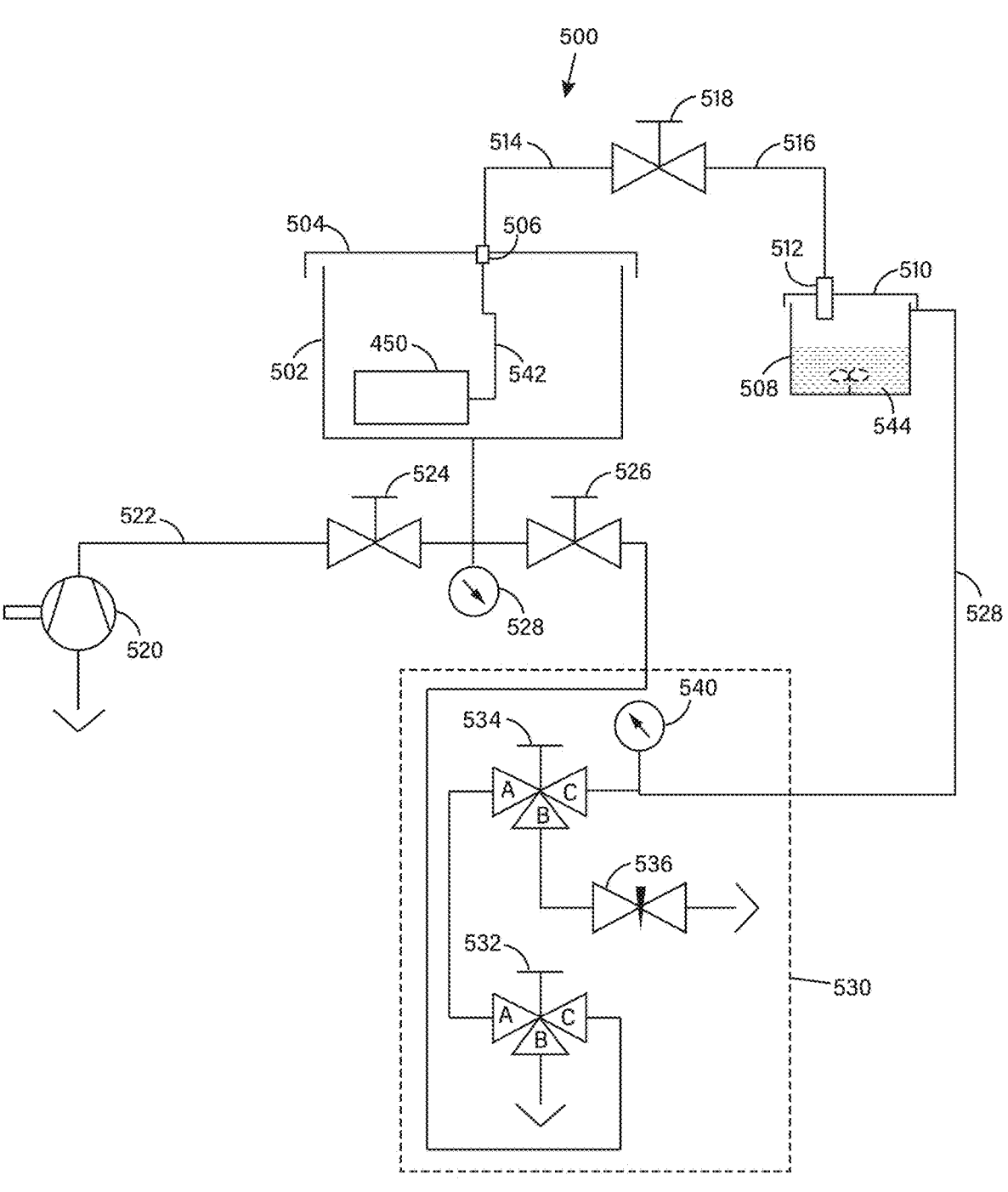
FIGS. 14A-14C are circuit diagrams of a vacuum injection molding system at different states.
Figure 14B:
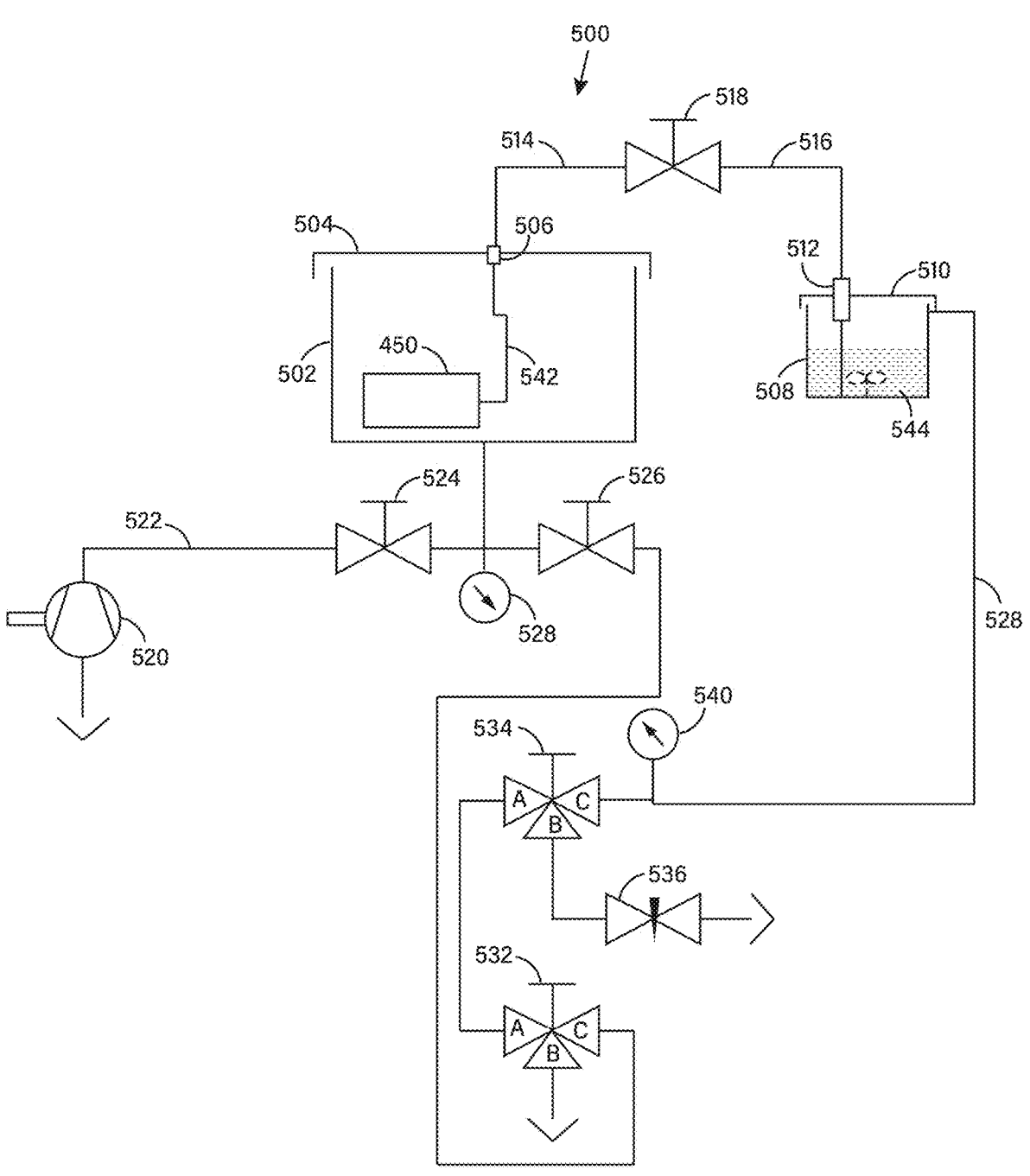

FIGS. 14A and 14B illustrate a vacuum injection molding system 500 that can be used to produce a molded elastic skin (e.g., a molded silicone skin) that is essentially bubble-free.

The vacuum injection molding system 500 includes a vacuum chamber 502 with a feedthrough 506 (e.g., the feedthrough 506 can be in a cover 504 of the vacuum chamber 502). One end of a vacuum chamber feedthrough tube 514 can be connected to the feedthrough 506. The other end of the vacuum chamber feedthrough tube 514 outside of the vacuum chamber 502 can be connected to a first port of a valve 518 (e.g., a pinch or squeeze valve).

The vacuum injection molding system 500 includes a mixing bowl 508 with a feedthrough 512 (e.g., the feedthrough 512 can be in a cover 510 of the mixing bowl 508). One end of a mixing bowl feedthrough tube 516 can be inserted through the feedthrough 512 into the mixing bowl 508. The other end of the mixing bowl feedthrough 516 outside of the mixing bowl 508 can be connected to a second port of the valve 518.

The vacuum injection molding system 500 includes a vacuum pump 520 that is connected to the vacuum chamber 502 through a vacuum pressure line 522. Vacuum pressure line valves 524, 526 and a pressure gauge 528 are connected to the vacuum pressure line 522.

The vacuum molding system 500 can include a valve manifold 530 having a vacuum chamber switching valve 532, a mixing bowl switching valve 534, and a bleed control valve 536. A "C" position of the vacuum chamber switching valve 532 is connected to the vacuum pressure line 522 through the vacuum pressure line valve 526. An "A" position of the vacuum chamber switching valve 532 is connected to an "A" position of the mixing bowl switching valve 534. A "C" position of the mixing bowl switching valve 534 is connected to a mixing bowl pressure line 538 that is connected to the mixing bowl 508. A mixing bowl pressure gauge 540 can be positioned to monitor the pressure in the mixing bowl pressure line 536. The bleed control valve 536 is connected to a "B" position of the mixing bowl switching valve 534. A "B" position of the vacuum chamber switching valve 532 can be connected to a drain without a bleed control valve.

Example VII—Vacuum Injection Molding Method

FIG. 15 illustrates a method 600 of molding an elastic skin around a mold insert using the vacuum injection molding system 500 described in Example VI and illustrated in FIG. 14A.

At 602 in FIG. 15, the method 600 includes loading an injection mold with a mold insert into a vacuum chamber. The mold insert 400 can be loaded into the injection mold 450 as shown in FIG. 13F and described in Example V. The injection mold 450 with the mold insert can be loaded into the vacuum chamber 502 as shown in FIG. 14A and described in Example VI.

At 604 in FIG. 15, the method 600 includes pouring an injection molding material into a mixing bowl. The injection molding material can be any suitable material for forming the elastic skin around the mold insert as described in Examples II and IV and that can be provided in liquid form. In one example, the injection molding material is silicone. In one example, referring to FIG. 14A, an injection molding material 544 (e.g., silicone) in liquid form can be poured into the mixing bowl 508. The injection molding material 544 can be mixed prior to being poured into the mixing bowl 508.

At 606 in FIG. 15, the method includes connecting an injection port of the injection mold within the vacuum chamber to a fluid communication line between the vacuum chamber and the mixing bowl. In one example, referring to FIG. 14A, the fluid communication line between the vacuum chamber 502 and the mixing bowl 508 includes the vacuum chamber feedthrough tube 514 that is connected to the vacuum chamber feedthrough 506, the mixing chamber feedthrough tube 516 that is inserted through the mixing bowl feedthrough 508, and the valve 518 connecting the vacuum chamber feedthrough tube 514 to the mixing bowl feedthrough tube 516. The method can include connecting the injection port 468 (shown in FIG. 13F) of the injection mold 450 to the vacuum feedthrough tube 506 using a tube 542, which would establish the connection between the injection port 468 and the feedthrough tubes 514, 516. At this stage, the mixing bowl feedthrough tube 516 can be retracted from the injection molding material 544 in the mixing bowl 508 to allow turning of the mixer in the mixing bowl 508 during degassing of the injection molding material 544 (see operation 610).

At 608 in FIG. 15, the method 600 includes connecting the vacuum chamber and the mixing bowl to a vacuum source. In one example, referring to FIG. 14A, the method includes setting the mixing bowl switching valve 534 to "A" position, opening the vacuum pressure lines valves 524, 526, and starting the vacuum pump 520 to connect the vacuum chamber 502 and the mixing bowl 508 to the vacuum pump 520.

At 610 in FIG. 15, the method 600 may include degassing the injection molding material in the mixing bowl under vacuum. In one example, referring to FIG. 14A, the method can include monitoring the pressures in the mixing bowl 508 and vacuum chamber 502 (e.g., via the pressure gauges 540, 528) to detect when vacuum has developed in the vacuum chamber 502 and the mixing bowl 508. In some examples, after vacuum has developed in the vacuum chamber 502 and the mixing bowl 508, the method may optionally include vigorously agitating the injection molding material 544 in the mixing bowl 508 to facilitate degassing the injection molding material 544. The agitation may continue for a time sufficient to complete degassing of the injection molding material 544 (e.g., approximately 5 minutes for silicone).

At 612 in FIG. 15, the method 600 includes disconnecting the mixing bowl from the vacuum source. In one example, referring to FIG. 14A, after the injection molding material 544 has been degassed as described in operation 610, the feedthrough tube 516 is extended to the bottom of the mixing bowl 508 and completely submerged in the silicone

544, as shown in FIG. 14B. The vacuum pressure line valve 526 is closed, which effectively disconnects the mixing bowl 508 from the vacuum source. The vacuum pressure line valve 524 remains open so that the vacuum chamber 502 is connected to the vacuum source (e.g., the vacuum pump 520). The mixing bowl 508 is allowed to reach atmospheric pressure while the vacuum chamber 502 remains at vacuum pressure.

At 614 in FIG. 15, the method 600 includes injecting the injection molding material into the mold cavity of the injection mold under vacuum. In one example, referring to FIG. 14A, while the vacuum chamber 502 is connected to the vacuum pump 520 and the mixing bowl 508 is disconnected from the vacuum pump 520, the mixing bowl 508 is allowed to reach atmospheric pressure. The pressure of the mixing bowl 508 can be monitored through the pressure gauge 540. After the mixing bowl 508 has reached atmospheric pressure, the valve 518 is opened to allow the injection molding material 544 to flow from the mixing bowl 508 into the mold cavity of the injection mold 450 within the vacuum chamber 502. The bleed control valve 536 can be adjusted to modulate the feedthrough speed of the silicone 544.

At 616 in FIG. 15, the method 600 includes ending flow of the injection molding material into the cavity of the injection mold. In one example, referring to FIG. 14B, the injection molding material 544 is allowed to fill the mold cavity of the injection mold 450 until the injecting molding resin 544 starts to flow through the bleed port 470 (shown in FIG. 13F) of the injection mold 450. When enough injection molding material 544 has bled through the bleed port 470, the valve 518 is closed to stop the flow of injection molding material 544 from the mixing bowl 508 to the mold cavity of the injection mold 450. Once the flow of silicone has stopped, the vacuum pressure line valve 524 can be opened to allow air to enter the vacuum chamber 502.

Figure 14C:
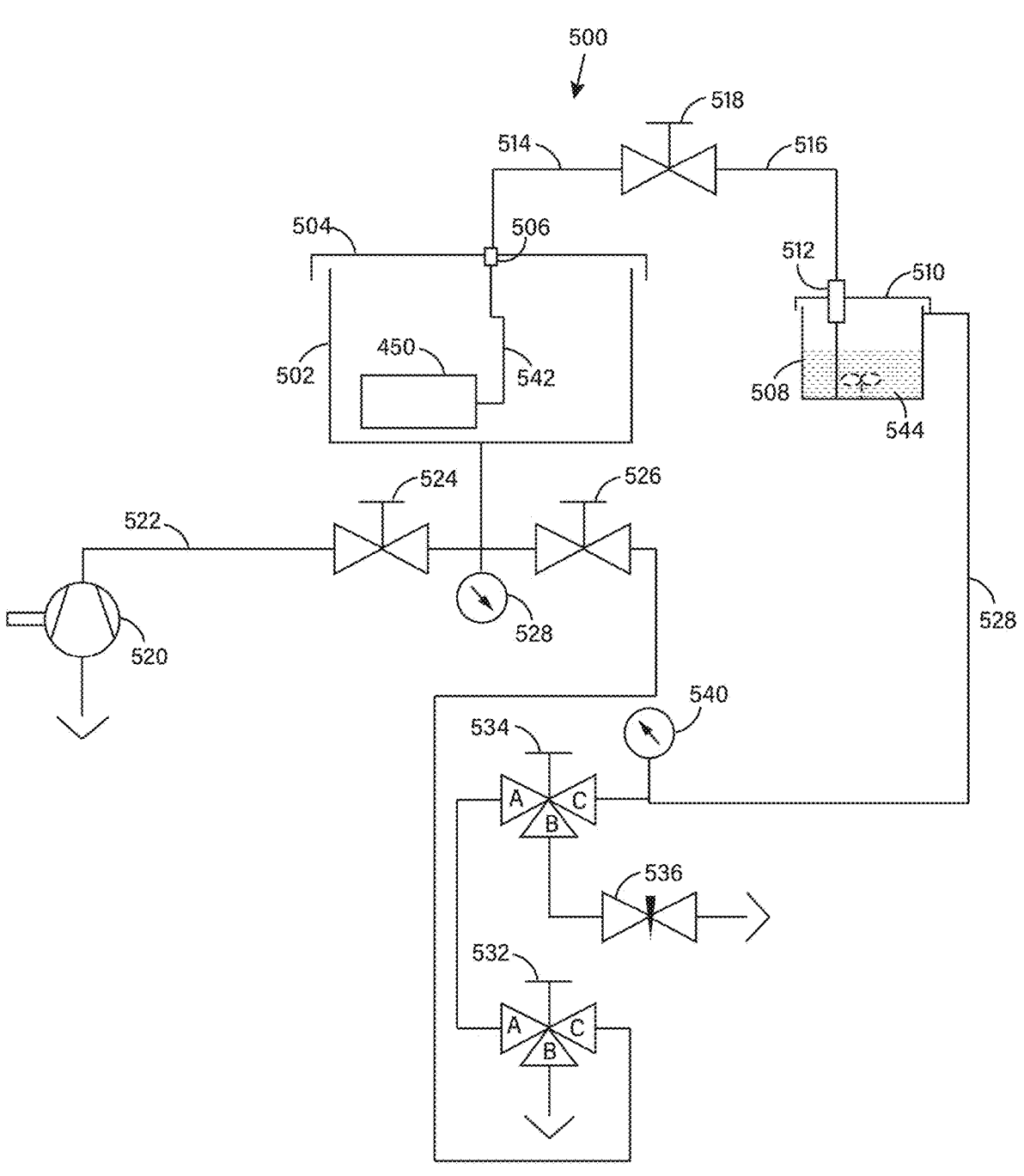

At 618 in FIG. 15, the method 600 includes allowing the injecting molding resin (e.g., silicone) in the mold cavity to cure. In one example, referring to FIG. 14C, after the flow of injecting mold resin 544 to the mold cavity of the injection mold 450 has stopped, the tube 542 is detached from the injection port 468 (shown in FIG. 13F) of the injection mold 450. In one example, the injection mold 450 (shown in FIG. 14C) can be left at room temperature for several hours to allow the injected molding material to cure. In another example, the injection mold 450 can be loaded into an oven to allow faster curing of the injecting molding resin. For example, for a silicone resin, the injection mold 450 can be loaded into an oven at 50° C. for approximately 2 hours for curing of the silicone. After the injection molding material has cured, the molded part (e.g., corresponding to the sensor preform 428 in Example IV) can be removed from the mold cavity.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A method of manufacturing a fluidic tactile sensor includes forming a mold insert comprising a sensor core and a skin insert attached to an outer surface of the sensor core, wherein the skin insert is at least partially soluble in a solvent and the sensor core is insoluble in the solvent; molding an elastic skin over the mold insert to form a sensor preform with the skin insert encapsulated between the elastic skin and the sensor core; removing the skin insert from between the elastic skin and the sensor core to form a sensor body with one or more cells between the elastic skin and the sensor core, wherein the skin insert is removed at least in part by applying the solvent to the skin insert to at least partially dissolve the skin insert; and attaching a pressure sensing circuit to the sensor core of the sensor body.

Example 2: A method according to Example 1, wherein the sensor core includes an inner surface defining a chamber within the sensor core, wherein the chamber is connected to the outer surface of the sensor core by at least one channel extending from the inner surface to the outer surface, and wherein removing the skin insert from between the elastic skin and the sensor core comprises exposing an opening of the at least one channel to the solvent.

Example 3: A method according to Example 2, wherein forming the mold insert further includes forming a plug insert in the chamber.

Example 3a: A method according to Example 3, wherein the sensor core, the plug insert, and the skin insert are formed using additive manufacturing.

Example 4: A method according to any of Examples 3-3a, further including removing the plug insert from the chamber contemporaneously with removing the skin insert from between the elastic skin and the sensor core.

Example 4a: A method according to Example 4, wherein the plug insert is at least partially soluble in the solvent, and wherein the plug insert is removed at least in part by applying the solvent to the plug insert to at least partially dissolve the plug insert.

Example 5: A method according to Example 1, wherein removing the skin insert from between the elastic skin and the sensor core comprises applying the solvent to the skin insert through at least one channel formed in the sensor core.

Example 6: A method according to Example 5, wherein applying the solvent to the skin insert through the at least one channel formed in the sensor core comprises disposing the sensor preform in a bath containing the solvent and agitating the bath.

Example 7: A method according to Example 6, further including agitating the bath at an ultrasonic frequency and adjusting the ultrasonic frequency responsively to an effective length of the at least one channel to increase a dissolution rate of the skin insert.

Example 8: A method according to Example 5, wherein applying the solvent to the skin insert through at least one channel formed in the sensor core comprises directing a fluid jet into the at least one channel.

Example 9: A method according to any one of Examples 1-8, further including, prior to molding the elastic skin over the mold insert to form the sensor preform, applying a chemical adhesion promoter to the sensor core to promote adhesion of the elastic skin to the sensor core at contact interfaces between the elastic skin and the sensor core.

Example 10: A method according to Example 9, wherein molding the elastic skin over the mold insert to form the sensor preform comprises loading the mold insert into a mold cavity of a vacuum injection mold and injecting an injection molding material into the mold cavity under vacuum.

Example 11: A method according to Example 10, wherein injecting the injection molding material into the mold cavity under vacuum includes disposing the mold cavity in a first chamber and connecting the first chamber to a vacuum source while injecting the injection molding material into the mold cavity.

Example 12: A method according to Example 11, wherein injecting the injection molding material into the mold cavity under vacuum further includes disposing the injection molding material in a second chamber and connecting the second chamber to atmospheric pressure while flowing the injection molding material from the second chamber into the mold cavity in the first chamber.

Example 13: A method according to any one of Examples 10-12, further including curing the injection molding material within the mold cavity.

Example 14: A method according to Example 1, wherein the sensor core includes an inner surface defining a chamber and one or more channels extending between the inner surface and the outer surface, and wherein attaching the pressure sensing circuit to the sensor core of the sensor body comprises mounting a first portion of the pressure sensing circuit within the chamber such that the first portion of the pressure sensing circuit extends over openings of the one or more channels at the inner surface.

Example 15: A method according to Example 14, further including forming a seal between the first portion of the pressure sensing circuit and the inner surface of the sensor core.

Example 16: A method according to Example 15, wherein forming the seal between the first portion of the pressure sensing circuit and the inner surface of the sensor core includes applying a potting material to the first portion of the pressure sensing circuit; disposing the first portion of the pressure sensing circuit adjacent to the inner surface of the sensor core; and applying pressure to the first portion of the pressure sensing circuit in a direction against the inner surface of the sensor core.

Example 17: A method according to Example 16, wherein applying the pressure to the first portion of the pressure sensing circuit comprises disposing a core insert within a volume formed by the first portion of the pressure sensing circuit within the chamber, wherein the core insert engages the first portion of the pressure sensing circuit and the inner surface of the sensor core to apply the pressure to the first portion of the pressure sensing circuit.

Example 18: A method according to Example 17, further comprising filling voids in the chamber with the potting material and curing the potting material.

Example 19: A method according to any one of Examples 1-18, wherein forming the mold insert comprising the sensor core and the skin insert attached to the outer surface of the sensor core comprises forming the mold insert using additive manufacturing.

Example 20: A method according to Example 19, wherein forming the mold insert comprising the sensor core and the skin insert attached to the outer surface of the sensor core comprises printing the sensor core using a water-insoluble polymer, printing the skin insert using a water-soluble polymer, and printing a plug insert inside a chamber of the sensor core using the water-soluble polymer.

The invention claimed is:

1. A method of manufacturing a fluidic tactile sensor, the method comprising:

forming a mold insert comprising a sensor core and a skin insert attached to an outer surface of the sensor core, wherein the skin insert is at least partially soluble in a solvent and the sensor core is insoluble in the solvent;

molding an elastic skin over the mold insert to form a sensor preform with the skin insert encapsulated between the elastic skin and the sensor core;

removing the skin insert from between the elastic skin and the sensor core to form a sensor body with one or more cells between the elastic skin and the sensor core, wherein the skin insert is removed at least in part by applying the solvent to the skin insert to at least partially dissolve the skin insert; and attaching a pressure sensing circuit to the sensor core of the sensor body.

2. The method of claim 1, wherein the sensor core comprises an inner surface defining a chamber within the sensor core, wherein the chamber is connected to the outer surface of the sensor core by at least one channel extending from the inner surface to the outer surface, and wherein removing the skin insert from between the elastic skin and the sensor core comprises exposing an opening of the at least one channel to the solvent.

3. The method of claim 2, wherein forming the mold insert further comprises forming a plug insert in the chamber, and wherein the sensor core, the plug insert, and the skin insert are formed using additive manufacturing.

4. The method of claim 3, further comprising removing the plug insert from the chamber contemporaneously with removing the skin insert from between the elastic skin and the sensor core, wherein the plug insert is at least partially soluble in the solvent, and wherein the plug insert is removed at least in part by applying the solvent to the plug insert to at least partially dissolve the plug insert.

5. The method of claim 1, wherein removing the skin insert from between the elastic skin and the sensor core comprises applying the solvent to the skin insert through at least one channel formed in the sensor core.

6. The method of claim 5, wherein applying the solvent to the skin insert through the at least one channel formed in the sensor core comprises disposing the sensor preform in a bath containing the solvent and agitating the bath.

7. The method of claim 6, further comprising agitating the bath at an ultrasonic frequency and adjusting the ultrasonic frequency responsively to an effective length of the at least one channel to increase a dissolution rate of the skin insert.

8. The method of claim 5, wherein applying the solvent to the skin insert through at least one channel formed in the sensor core comprises directing a fluid jet into the at least one channel.

9. The method of claim 1, further comprising, prior to molding the elastic skin over the mold insert to form the sensor preform, applying a chemical adhesion promoter to the sensor core to promote adhesion of the elastic skin to the sensor core at contact interfaces between the elastic skin and the sensor core.

10. The method of claim 9, wherein molding the elastic skin over the mold insert to form the sensor preform comprises loading the mold insert into a mold cavity of a vacuum injection mold and injecting an injection molding material into the mold cavity under vacuum.

11. The method of claim 10, wherein injecting the injection molding material into the mold cavity under vacuum comprises:

disposing the mold cavity in a first chamber; and connecting the first chamber to a vacuum source while injecting the injection molding material into the mold cavity.

12. The method of claim 11, wherein injecting the injection molding material into the mold cavity under vacuum further comprises:

disposing the injection molding material in a second chamber; and connecting the second chamber to atmospheric pressure while flowing the injection molding material from the second chamber into the mold cavity in the first chamber.

13. The method of claim 10, further comprising curing the injection molding material within the mold cavity.

14. The method of claim 1, wherein the sensor core comprises an inner surface defining a chamber and one or more channels extending between the inner surface and the outer surface, and wherein attaching the pressure sensing circuit to the sensor core of the sensor body comprises mounting a first portion of the pressure sensing circuit within the chamber such that the first portion of the pressure sensing circuit extends over openings of the one or more inner channels at the inner surface.

15. The method of claim 14, further comprising forming a seal between the first portion of the pressure sensing circuit and the inner surface of the sensor core.

16. The method of claim 15, wherein forming the seal between the first portion of the pressure sensing circuit and the inner surface of the sensor core comprises:

applying a potting material to the first portion of the pressure sensing circuit;

disposing the first portion of the pressure sensing circuit adjacent to the inner surface of the sensor core; and applying pressure to the first portion of the pressure sensing circuit in a direction against the inner surface of the sensor core.

17. The method of claim 16, wherein applying the pressure to the first portion of the pressure sensing circuit comprises disposing a core insert within a volume formed by the first portion of the pressure sensing circuit within the chamber, wherein the core insert engages the first portion of the pressure sensing circuit and the inner surface of the sensor core to apply the pressure to the first portion of the pressure sensing circuit.

18. The method of claim 17, further comprising filling voids in the chamber with the potting material and curing the potting material.

19. The method of claim 1, wherein forming the mold insert comprising the sensor core and the skin insert attached to the outer surface of the sensor core comprises forming the mold insert using additive manufacturing.

20. The method of claim 19, wherein forming the mold insert comprising the sensor core and the skin insert attached to the outer surface of the sensor core comprises printing the sensor core using a water-insoluble polymer, printing the skin insert using a water-soluble polymer, and printing a plug insert inside a chamber of the sensor core using the water-soluble polymer.

* * * * *